United States Patent
Sheehe et al.

(10) Patent No.: US 11,646,807 B2
(45) Date of Patent: May 9, 2023

(54) METHODS INCLUDING DETECTING CABLES CONNECTED TO PORTS OF COMMUNICATIONS NETWORK EQUIPMENT AND RELATED SYSTEMS

(71) Applicant: CommScope Technologies LLC, Hickory, NC (US)

(72) Inventors: Thomas G. Sheehe, Allen, TX (US); Troy I. Vanderhoof, Prosper, TX (US); Martin L. Zimmerman, Chicago, IL (US); Sanchit Vohra, Champaign, IL (US); Prathikshaa Rangarajan, Durham, NC (US)

(73) Assignee: CommScope Technologies LLC, Hickory, NC (US)

( * ) Notice: Subject to any disclaimer, the term of this patent is extended or adjusted under 35 U.S.C. 154(b) by 62 days.

(21) Appl. No.: 16/998,808

(22) Filed: Aug. 20, 2020

(65) Prior Publication Data

US 2021/0058167 A1 Feb. 25, 2021

Related U.S. Application Data

(60) Provisional application No. 62/889,742, filed on Aug. 21, 2019.

(51) Int. Cl.
| | | |
|---|---|---|
| *G06V 20/20* | (2022.01) |
| *H04B 17/12* | (2015.01) |
| *H04B 17/15* | (2015.01) |
| *H04B 17/29* | (2015.01) |
| *H04W 4/80* | (2018.01) |
| *G06V 20/10* | (2022.01) |
| *G06V 10/56* | (2022.01) |
| *G06V 10/44* | (2022.01) |
| *G06V 20/52* | (2022.01) |

(52) U.S. Cl.
CPC ............ *H04B 17/12* (2015.01); *G06V 10/44* (2022.01); *G06V 10/56* (2022.01); *G06V 20/176* (2022.01); *G06V 20/52* (2022.01); *H04B 17/15* (2015.01); *H04B 17/29* (2015.01); *H04W 4/80* (2018.02)

(58) Field of Classification Search
CPC combination set(s) only.
See application file for complete search history.

(56) References Cited

U.S. PATENT DOCUMENTS

| | | | |
|---|---|---|---|
| 8,629,671 B1 * | 1/2014 | Bradley | G01R 35/005 324/76.19 |
| 10,049,276 B1 * | 8/2018 | Harper | H04N 21/4425 |
| 10,103,992 B1 * | 10/2018 | Bshara | H04L 47/125 |
| 10,812,988 B1 * | 10/2020 | Khan | H04L 41/22 |
| 11,010,907 B1 * | 5/2021 | Bagwell | G06V 20/64 |
| 11,315,226 B2 * | 4/2022 | Acevedo | G06T 7/0002 |
| 11,374,808 B2 * | 6/2022 | Brun | H04L 41/12 |
| 2009/0096581 A1 * | 4/2009 | Macauley | H04Q 1/138 340/572.7 |

(Continued)

*Primary Examiner* — Cindy Trandai
(74) *Attorney, Agent, or Firm* — Myers Bigel, P.A.

(57) ABSTRACT

Methods that include detecting cables connected to telecommunications network equipment are provided herein. In particular, a method that includes detecting connections of respective cables to ports of telecommunications network equipment may be performed using image recognition. Moreover, in some embodiments, the method may include detecting, using image recognition, respective positions of the ports. Related systems are also provided.

24 Claims, 20 Drawing Sheets

(56) References Cited

U.S. PATENT DOCUMENTS

| | | | |
|---|---|---|---|
| 2009/0232354 A1* | 9/2009 | Camp, Jr. | H04N 5/23229 382/103 |
| 2010/0240317 A1* | 9/2010 | Giles | H04B 17/309 455/67.13 |
| 2012/0189259 A1* | 7/2012 | Manes | H04Q 1/136 29/407.1 |
| 2013/0148524 A1* | 6/2013 | Holzmann | G01R 35/005 370/252 |
| 2013/0223684 A1* | 8/2013 | Townend | G06F 3/0484 382/103 |
| 2014/0111346 A1* | 4/2014 | Pinn | G06F 9/44505 340/691.6 |
| 2014/0330511 A1* | 11/2014 | Tison | G06T 19/006 701/428 |
| 2015/0091755 A1* | 4/2015 | Chawgo | H01Q 1/246 342/359 |
| 2015/0256797 A1* | 9/2015 | Torben | B66D 1/36 348/46 |
| 2016/0132532 A1* | 5/2016 | German | G06V 20/20 340/687 |
| 2016/0134484 A1* | 5/2016 | Tanaka | H04L 41/145 345/633 |
| 2017/0223559 A1* | 8/2017 | Kong | H04W 24/06 |
| 2017/0228889 A1* | 8/2017 | Kato | G06T 7/001 |
| 2018/0077200 A1* | 3/2018 | Apvrille | H04L 63/1416 |
| 2018/0088161 A1* | 3/2018 | Bell | G01R 29/0814 |
| 2018/0286289 A1* | 10/2018 | Liversidge | H01B 7/368 |
| 2018/0293696 A1* | 10/2018 | Appu | G06T 1/20 |
| 2019/0026930 A1* | 1/2019 | Kritzler | G06V 20/20 |
| 2019/0268473 A1* | 8/2019 | Amir | G06T 11/60 |
| 2019/0372861 A1* | 12/2019 | Roy | H04L 41/5074 |
| 2020/0059566 A1* | 2/2020 | Dolce | H04N 1/00145 |
| 2020/0137918 A1* | 4/2020 | Takisaki | H04N 19/17 |
| 2020/0186436 A1* | 6/2020 | Hu | H04L 41/0806 |
| 2020/0275174 A1* | 8/2020 | Qi | G02B 6/4452 |
| 2020/0349736 A1* | 11/2020 | Mustafi | G06V 10/82 |
| 2021/0083992 A1* | 3/2021 | Didear | H04L 45/64 |
| 2021/0297126 A1* | 9/2021 | Cao | H04W 74/0833 |
| 2021/0366092 A1* | 11/2021 | Venkatraman | G06V 10/17 |
| 2021/0374406 A1* | 12/2021 | Brun | G06F 16/24569 |

* cited by examiner

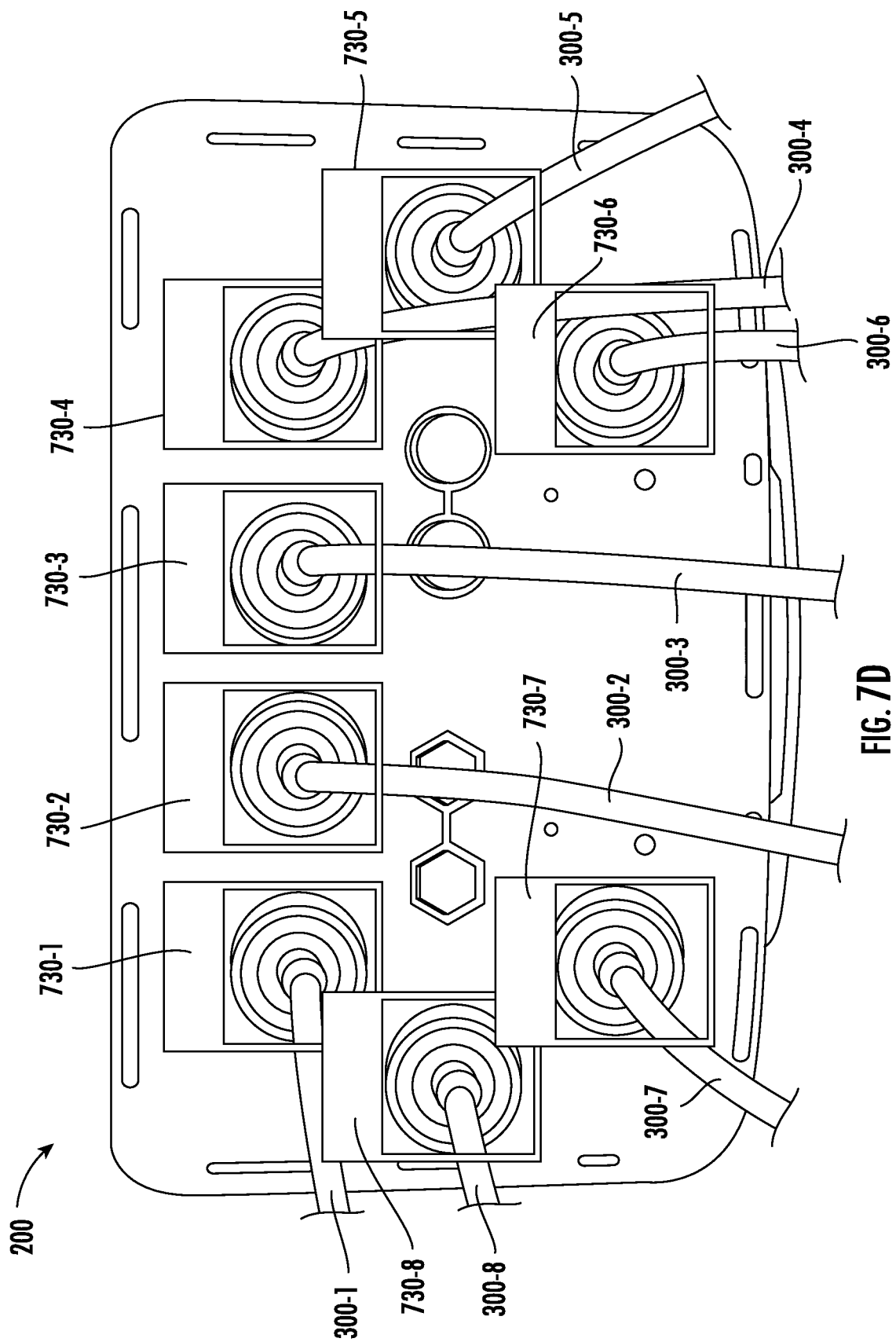

METHODS INCLUDING DETECTING CABLES CONNECTED TO PORTS OF COMMUNICATIONS NETWORK EQUIPMENT AND RELATED SYSTEMS

CROSS-REFERENCE TO RELATED APPLICATION

The present application claims priority to U.S. Provisional Patent Application No. 62/889,742, filed Aug. 21, 2019, the entire content of which is incorporated herein by reference.

FIELD

The present disclosure relates to communication systems and, in particular, to connections of cables to communications network equipment.

BACKGROUND

Telecommunications network equipment, such as a base station antenna, may include several ports for Radio Frequency ("RF") signals. When installing the equipment, a human operator will typically manually connect cables to the ports. Moreover, to test the equipment, the operator may need to manually connect specific cables to specific ports on the equipment. If the cables are misconnected, then the equipment may not be tested properly, which may cause operator delays or product quality escapes. For example, improper isolation testing may result in the equipment being shipped from a factory despite having adjacent ports that are not properly connected. It may be challenging to quickly and accurately connect the cables, however, especially when the operator must test different equipment or when the equipment has a large number of ports.

SUMMARY

A method of configuring an RF switch, according to some embodiments herein, may include detecting, using image recognition, connections of cables to respective ports of an antenna. The method may include assigning the ports of the antenna to the RF switch, in response to the detecting. Moreover, the method may include testing the antenna, using the RF switch. In some embodiments, the testing may include return loss testing, isolation testing, and radiation pattern testing.

According to some embodiments, the method may include transmitting data regarding the connections of the cables from a first electronic device to a second electronic device, in response to the detecting. The detecting may include controlling, via the first electronic device, a camera to capture at least one image of the antenna. Moreover, the detecting may include processing, via the first electronic device, the at least one image of the antenna to generate the data regarding the connections of the cables. The assigning may include mapping, via the second electronic device, the ports of the antenna to ports of the RF switch, using the data regarding the connections of the cables. The transmitting may be performed via a wired or short-range wireless connection between the first and second electronic devices.

In some embodiments, the testing may include connecting a first port or second port of a network analyzer to the ports of the antenna via the RF switch.

According to some embodiments, the method may include detecting a respective position on the antenna of each of the ports of the antenna. Moreover, detecting the connections of the cables may include identifying different respective positions of the cables on the antenna.

In some embodiments, the detecting may include identifying different respective visual indicators on the cables. For example, the visual indicators may include different respective colors, or different respective combinations of colors, on the cables. The colors, or the combinations of colors, may be on respective cable collars. As another example, the visual indicators may include different respective barcodes, strings of alphanumeric characters, or polygonal shapes on the cables.

An RF switch configuration system, according to some embodiments herein, may include a first electronic device that is configured to detect, using image recognition, connections of cables to respective ports of an antenna. The system may include a second electronic device that is configured to: receive data regarding the connections of the cables from the first electronic device; and assign the ports of the antenna to the RF switch, using the data regarding the connections of the cables. Moreover, the system may include an RF instrument that is configured to test the antenna, using the RF switch.

In some embodiments, the RF instrument may be a network analyzer that is configured to measure return loss, isolation, and radiation pattern of the antenna. Moreover, the RF switch may be configured to connect a first port or second port of the network analyzer to the ports of the antenna. The ports of the antenna may be thirty or more ports, and the antenna may be a cellular base station antenna.

A method, according to some embodiments herein, may include detecting, using image recognition, respective positions of ports on telecommunications network equipment. Moreover, the method may include detecting, using image recognition, connections of respective cables to the ports of the telecommunications network equipment. In some embodiments, the detecting the connections may include detecting color-coded collars on the cables.

According to some embodiments, the telecommunications network equipment may be a cellular base station antenna, and the method may include: assigning the ports of the cellular base station antenna to an RF switch, in response to the detecting the connections; and testing the cellular base station antenna, using the RF switch.

In some embodiments, the telecommunications network equipment may be a cellular base station antenna, and the method may include: determining that the cables are connected to corresponding frequency groups of the ports of the cellular base station antenna, in response to the detecting the connections; and triggering passive intermodulation ("PIM") testing of the cellular base station antenna, in response to the determining.

According to some embodiments, the detecting the connections may include determining that at least one of the cables is misconnected to the telecommunications network equipment. Moreover, the method include providing, via an electronic device, a user notification that the at least one of the cables is misconnected.

In some embodiments, the method may include calibrating a switch that is coupled to at least one of the cables, in response to the detecting the connections. Moreover, before the calibrating, the at least one of the cables may be port-agnostic with respect to the ports of the telecommunications network equipment.

According to some embodiments, the method may include comparing the connections with predetermined connections for the telecommunications network equipment. Moreover, the method may include electronically notifying an operator of a cellular base station having the telecommunications network equipment of a result of the comparing. The cables may be cellular base station jumper cables, and the image recognition may include capturing, via a camera that is located in the field, at least one image of the cellular base station jumper cables on the telecommunications network equipment.

In some embodiments, the method may include capturing, by a first electronic device, images of the telecommunications network equipment. The method may include transmitting image data based on the images to a second electronic device that is remote to the first electronic device, and the image recognition may be performed using the second electronic device. Moreover, the method may include receiving, at the first electronic device, data from the second electronic device regarding results of the image recognition.

BRIEF DESCRIPTION OF THE DRAWINGS

FIGS. 7A-7G are perspective views of antenna ports of FIG. 2. Specifically, FIG. 7A-7D illustrate a sequence of operations of detecting the ports and detecting cables of FIG. 3A, 3B, or 4 that are connected to the ports. FIG. 7E illustrates visual indicators that are on the cables, and FIG. 7F is an enlarged view of one of the visual indicators. FIG. 7G illustrates an antenna of FIG. 2 that has thirty ports that are connected to thirty cables, respectively.

DETAILED DESCRIPTION

Figure 1:
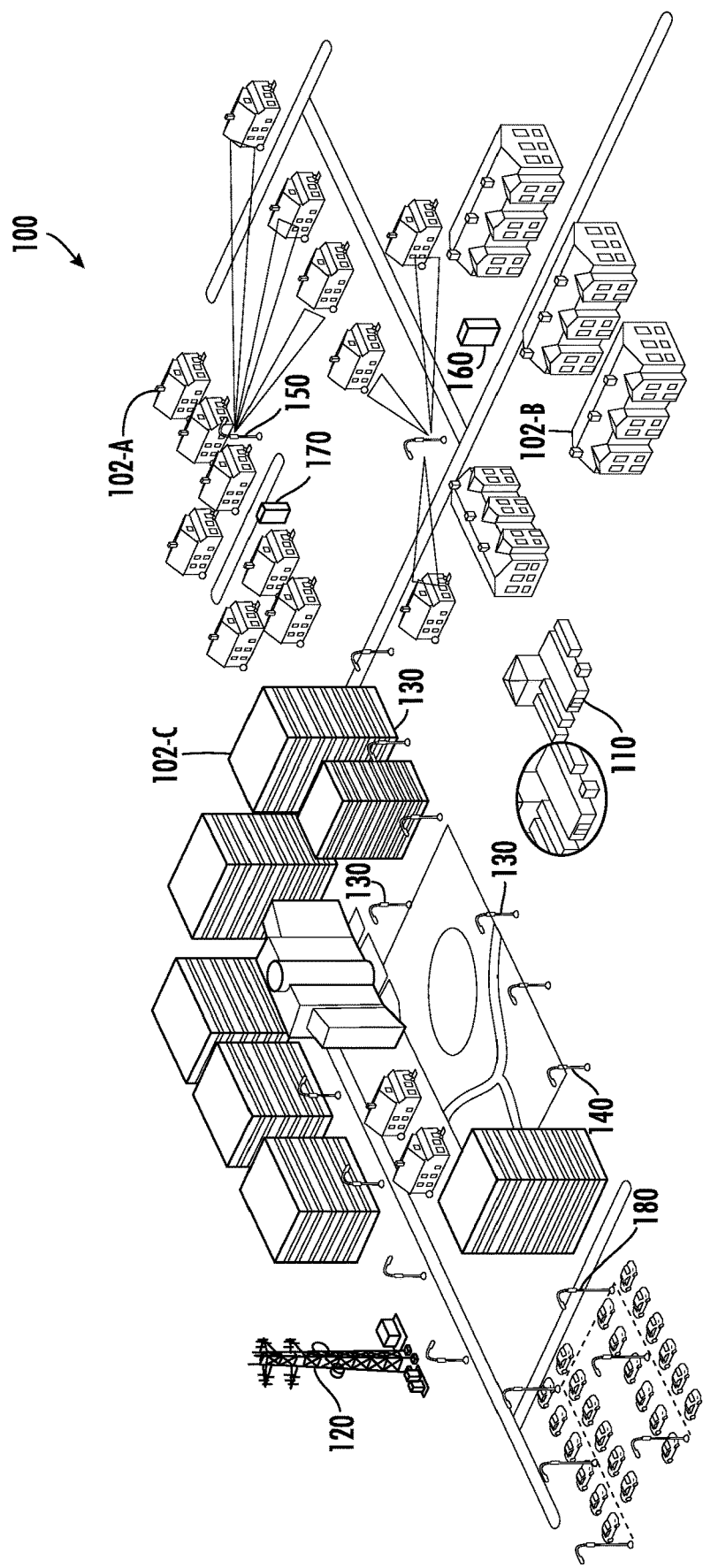
FIG. 1 is a schematic diagram illustrating the increasing data connectivity needs for information and communication technology infrastructure.

Pursuant to embodiments of the present inventive concepts, methods that include using image recognition to detect cables connected to telecommunications network equipment are provided. For example, each cable that is connected to an antenna may have a unique identifier that is detectable by machine vision. The position of the cable on the antenna may also be detected. As an example, the antenna port to which the cable is connected may be identified by detecting the position of the unique identifier and comparing it with a detected position of the antenna port.

The unique identifier may be, for example, a color-coded collar. As used herein, the term "color-coded collar" refers to a cable collar that is on an end portion of a cable. In some embodiments, opposite end portions of the cable may have respective color-coded collars. Each color-coded collar may have one or more colors. For example, each cable's collar(s) may use a color, or a combination of colors (e.g., inner and outer colored rings), that is unique to a respective cable, thus allowing image recognition to distinguish between different cables.

In some embodiments, image recognition may be used when a human installer attaches multiple cables (e.g., nine cables) between an antenna (e.g., with twenty or more ports) and a radio (e.g., with nine ports) and/or an RF filter or a Tower Mounted Amplifier ("TMA"). In some embodiments, color-coded collars may be on both ends of each jumper cable that the installer attaches. Accordingly, the installer can take photographs of the antenna, radio, filter, and/or TMA, and image recognition can be performed with respect to the photographs to improve the speed and accuracy of the installation. As an example, a software application on an electronic device used by the installer may use image recognition to guide (e.g., with step-by-step instructions) the installer through the connection process in real-time. Moreover, after the installer makes the connections, the application may use image recognition with respect to photographs of the completed connections to confirm that the connections have been made correctly.

The present inventive concepts are not limited, however, to the context of installing telecommunications network equipment. Rather, the present inventive concepts may be used to improve testing of telecommunications network equipment for performance characteristics such as return loss, isolation, and pattern. As an example, the present inventive concepts may use image recognition to quickly and accurately detect cables that are connected between the equipment and an RF switch that is used by an RF instrument to test the equipment before deploying the equipment to the field for installation. By contrast, manually verifying the accuracy of cable connections that are used to test the equipment can be particularly tedious and time-consuming when the equipment has a large number (e.g., twenty, thirty, or more) of ports. If the cables are not connected in a predetermined arrangement to the ports, testing may fail, thus causing a human test operator to change the connections and re-run a test, thereby resulting in time delays. Moreover, in some cases, misconnected equipment may pass a test, but be tested improperly due to misconnection(s), meaning that potentially-failing equipment may be deployed to the field. Accordingly, by ensuring the accuracy of cable connections that are used while testing the equipment, the present inventive concepts can save time for the test operator and can improve the validity of the testing.

In some embodiments, ports of equipment may be assigned to an RF switch after the test operator connects cables to the equipment. As a result, the test operator can connect a bundle of cables to ports of the equipment in any arrangement, thus precluding the possibility of connecting a cable to the wrong port. This saves the test operator time because the test operator does not need to correctly match cables to pre-assigned ports. Cables for testing may thus be referred to herein as "port-agnostic."

Example embodiments of the present inventive concepts will be described in greater detail with reference to the attached figures.

FIG. 1 is a schematic diagram illustrating the increasing data connectivity needs for information and communication technology infrastructure. As shown in FIG. 1, in an urban or suburban environment 100, a telecommunications provider, such as a cellular network operator, may operate a central office 110 and a macrocell base station 120. In addition, the telecommunications provider may operate a plurality of small cell base stations 130, WiFi access points 140, fixed wireless nodes 150, active cabinets 160, DSL (e.g., G.fast) distribution points 170, security cameras 180, and the like. FIG. 1 also illustrates a plurality of buildings 102, including single-family houses 102-A, multi-unit commercial and/or residential buildings 102-B, and office/industrial buildings 102-C where cellular service may be desired.

Figure 2:
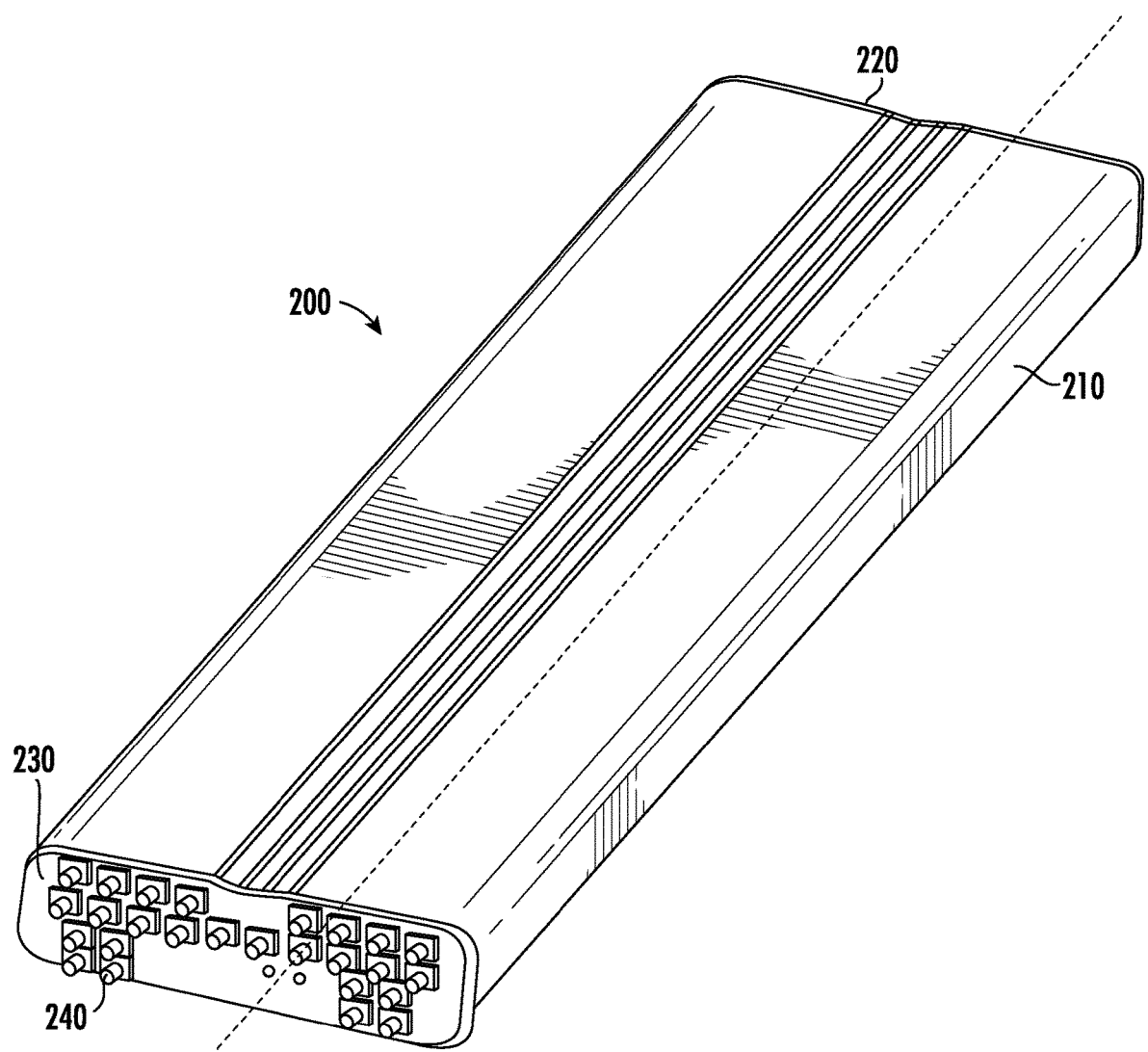
FIG. 2 is a front perspective view of a base station antenna according to embodiments of the present inventive concepts.

FIG. 2 is a front perspective view of a base station antenna 200 according to embodiments of the present inventive concepts. The antenna 200 may be, for example, a cellular base station antenna at a macrocell base station 120 (FIG. 1) or at a small cell base station 130 (FIG. 1). As shown in FIG. 2, the antenna 200 is an elongated structure and has a generally rectangular shape. The antenna 200 includes a radome 210. In some embodiments, the antenna 200 further includes a top end cap 220 and/or a bottom end cap 230. For example, the radome 210, in combination with the top end cap 220, may comprise a single unit, which may be helpful for waterproofing the antenna 200. The bottom end cap 230 is usually a separate piece and may include a plurality of RF connectors 240 mounted therein. The connectors 240, which may also be referred to herein as "ports," are not limited, however, to being located on the bottom end cap 230. Rather, one or more of the connectors 240 may be provided on the rear (i.e., back) side of the radome 210 that is opposite the front side of the radome 210. The antenna 200 is typically mounted in a vertical configuration (i.e., the long side of the antenna 200 extends along a vertical axis L with respect to Earth).

Figure 3A:
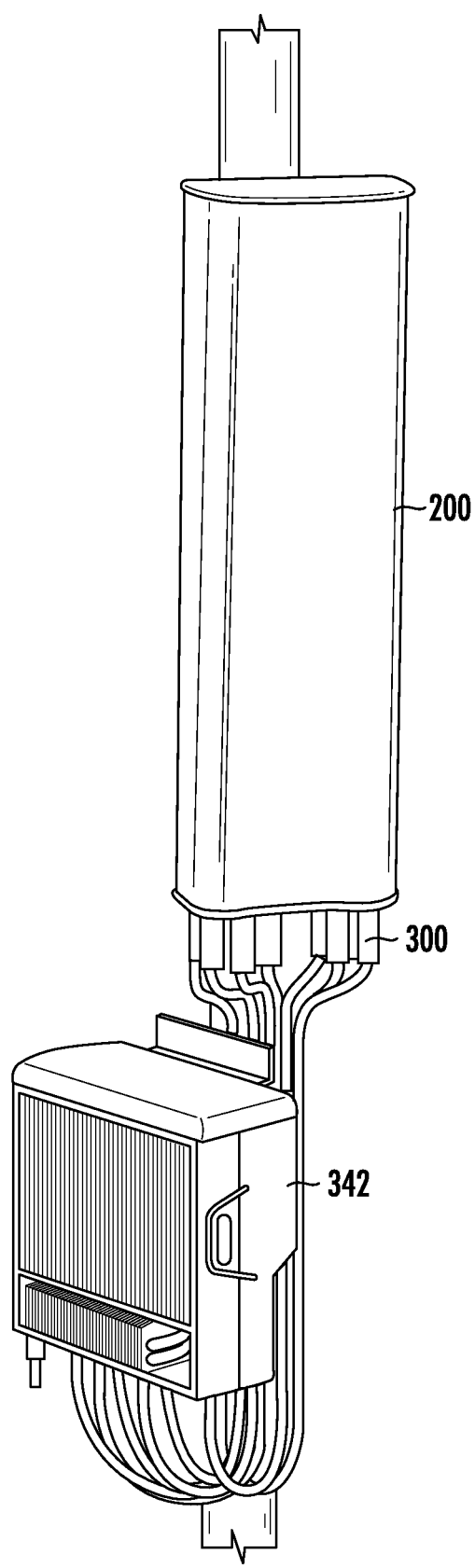
FIG. 3A is a front perspective view of the base station antenna of FIG. 2 electrically connected to a radio.

FIG. 3A is a front perspective view of the antenna 200 (FIG. 2) electrically connected to a radio 342 by cables 300. In some embodiments, the antenna 200 and the radio 342 may be located at (e.g., may be components of) a macrocell base station 120 (FIG. 1) or a small cell base station 130 (FIG. 1).

Figure 3B:
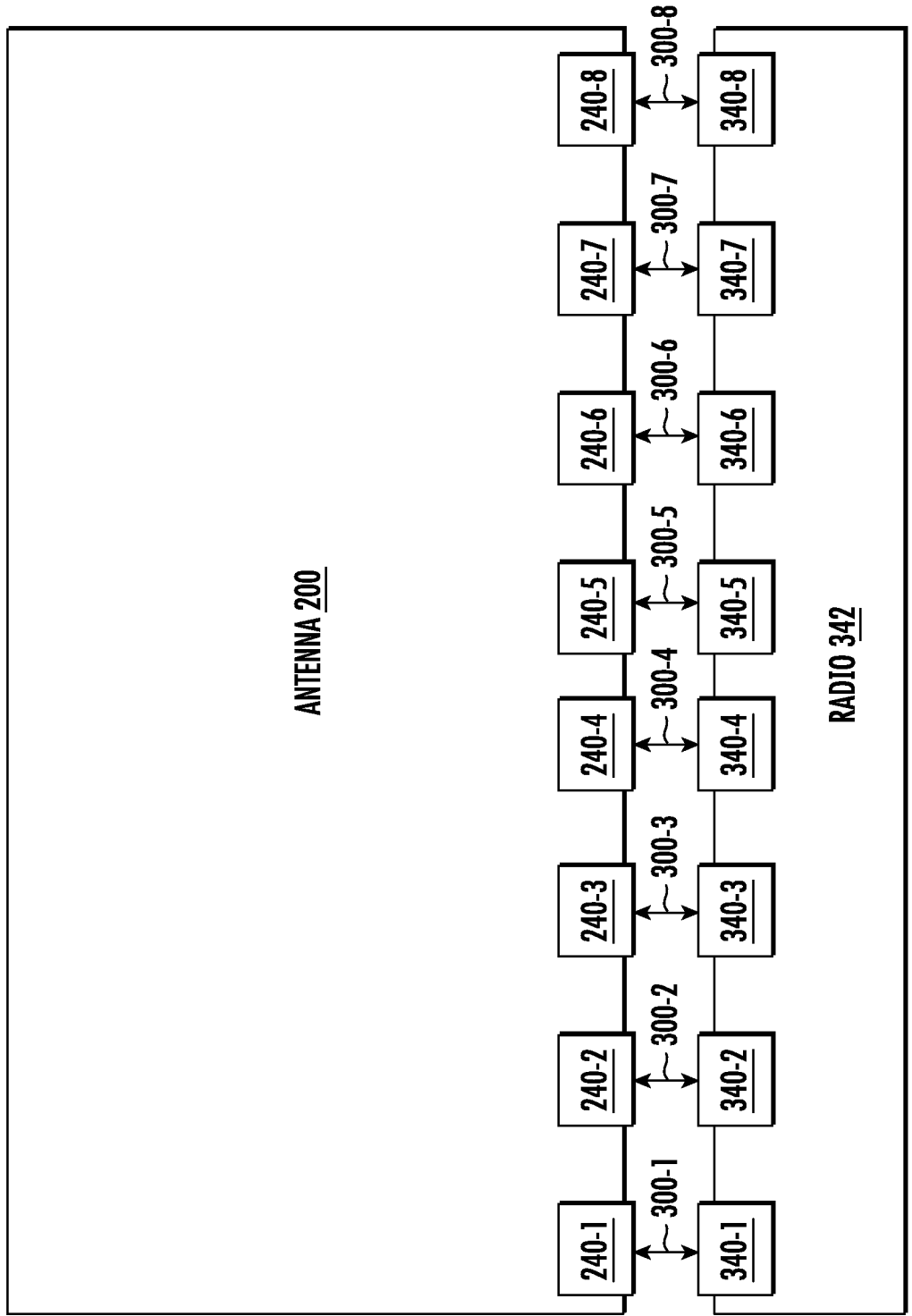
FIG. 3B is a schematic block diagram of the antenna ports of FIG. 2 electrically connected to ports of the radio of FIG. 3A.

FIG. 3B is a schematic block diagram of antenna ports 240 (FIG. 2) electrically connected to ports 340 of the radio 342 (FIG. 3A). For example, the radio 342 may be a beam-forming radio or multiple-input, multiple-output ("MIMO") radio of a cellular base station, and the ports 340 may be beam-former ports or MIMO ports. As shown in FIG. 3B, the ports 240-1 through 240-8 of the antenna 200 (FIG. 2) are electrically connected to ports 340-1 through 340-8, respectively, of the radio 342 by respective cables 300-1 through 300-8, such as coaxial cables. For simplicity of illustration, only eight ports 240 are shown in FIG. 3B. In some embodiments, however, the antenna 200 may include twelve, twenty, thirty, or more ports 240.

Figure 4:
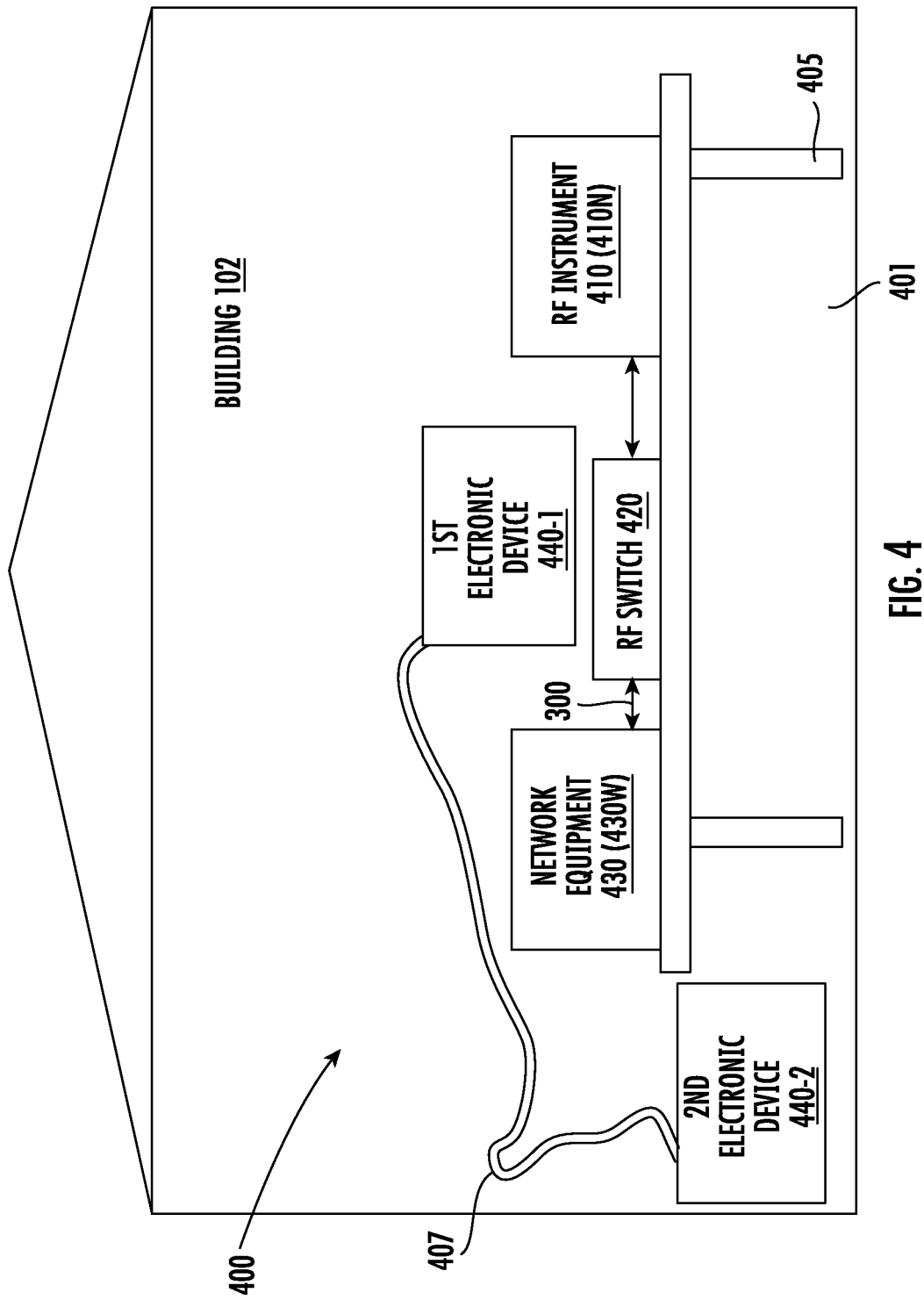
FIG. 4 is a schematic block diagram of a system, according to embodiments of the present inventive concepts, that is configured to detect cable connections, configure an RF switch, and test telecommunications network equipment.

FIG. 4 is a schematic block diagram of a system 400 that is configured to (i) detect cable 300 connections, (ii) configure an RF switch 420, and (iii) test telecommunications network equipment 430. The system 400 may include an RF instrument 410 and first and second electronic devices 440-1 and 440-2. For example, the network equipment 430 may be wireless telecommunications network equipment 430W, such as an antenna 200 (FIG. 2), and the instrument 410 may be a network analyzer 410N that is configured to test (a) return loss, (b) isolation, and (c) a radiation pattern of the antenna 200. The instrument 410 feeds to the switch 420, which connects to ports 240 (FIG. 2) of the antenna 200. In some embodiments, every port 240 must connected to the switch 420 to ensure proper testing. Otherwise, false failures may occur due to testing the wrong port 240.

The first electronic device 440-1 may include a camera C (FIG. 5A) that faces the ports 240 and captures one or more images of the cable 300 connections to the ports 240. For example, the camera C may be positioned on or above a table 405 on which the antenna 200 is placed. In some embodiments, the instrument 410, the switch 420, and/or the second electronic device 440-2 may also be on the table 405, which may be in an interior region 401 of a building 102 (FIG. 1) where the antenna 200 is tested before its deployment to the field. Moreover, the camera C may be built-in to the first electronic device 440-1. Alternatively, the camera C may be external and communicatively coupled to the first electronic device 440-1.

The camera C may be, for example, an eight-megapixel (or higher resolution) camera that the first electronic device 440-1 uses along with image recognition (e.g., machine learning) software to detect how the antenna 200 is connected. As an example, the first electronic device 440-1 may identify cables 300 (e.g., identification numbers thereof) and their locations on the antenna 200. The first electronic device 440-1 may then transmit this information to the second electronic device 440-2, which uses the information to automatically configure the switch 420 to test the antenna 200. In some embodiments, the second electronic device 440-2 automatically configures the switch 420 in response to receiving this information for all of the ports 240 (i.e., once the antenna 200 is fully connected to the cables 300).

The second electronic device 440-2 may be communicatively coupled to the first electronic device 440-1, the instrument 410, and/or the switch 420. For example, the first and second electronic devices 440-1 and 440-2 may be connected to each other by a wired connection, such as a Universal Serial Bus ("USB") cable 407. Moreover, the second electronic device 440-2 may have wired or wireless communications with the instrument 410 and/or the switch 420. For example, the second electronic device 440-2 may control configuration of the switch 420 and/or may trigger the instrument 410 to test the antenna 200.

Though the first and second electronic devices 440-1 and 440-2 are shown as individual devices, they may alternatively be integrated in a single electronic device 440. Accordingly, the hardware and software of the first and second electronic devices 440-1 and 440-2 may be provided inside a single device housing.

Moreover, the second electronic device 440-2, and/or another (e.g., third) electronic device 440, may be a computer server that hosts one or more software applications that perform one or more of the operations shown in FIGS. 10A-10H. For example, for a field installation, the first electronic device 440-1 may be used by a human installer to guide the installer through the installation and to collect information (e.g., photographs) and transmit the information to the cloud, which may include the server. As an example, the server (or a group of servers) may host a server-based application (e.g., including a database) that performs one or more image recognition algorithms. The server(s) may then transmit image recognition results back to the first electronic device 440-1. Such communications between the server(s) and the first electronic device 440-1 may be, for example, communications over the Internet and/or cellular communications. Accordingly, though a software application (e.g., a smartphone application) on the first electronic device 440-1 may locally capture images and/or display instructions to guide the installer, some or all processing of the captured images may be performed remotely to the first electronic device 440-1, thus relieving some of the processing burden on the first electronic device 440-1. For factory testing operations, some or all processing may similarly be performed remotely.

In some embodiments, the system 400 may not include the switch 420 and the instrument 410, and the system 400 may thus be configured to (i) detect cable 300 connections without also (ii) configuring the switch 420 and (iii) testing the network equipment 430. For example, the system 400 may be used for installation of the network equipment 430 rather than for testing. Moreover, though the antenna 200 is discussed herein as an example of the network equipment 430, the network equipment 430 may alternatively be a radio 342 (FIGS. 3A and 3B) or other telecommunications network equipment that is configured to provide, or connect to, a telecommunications service. For example, the network equipment 430 may be an RF filter or a TMA.

Figure 5A:
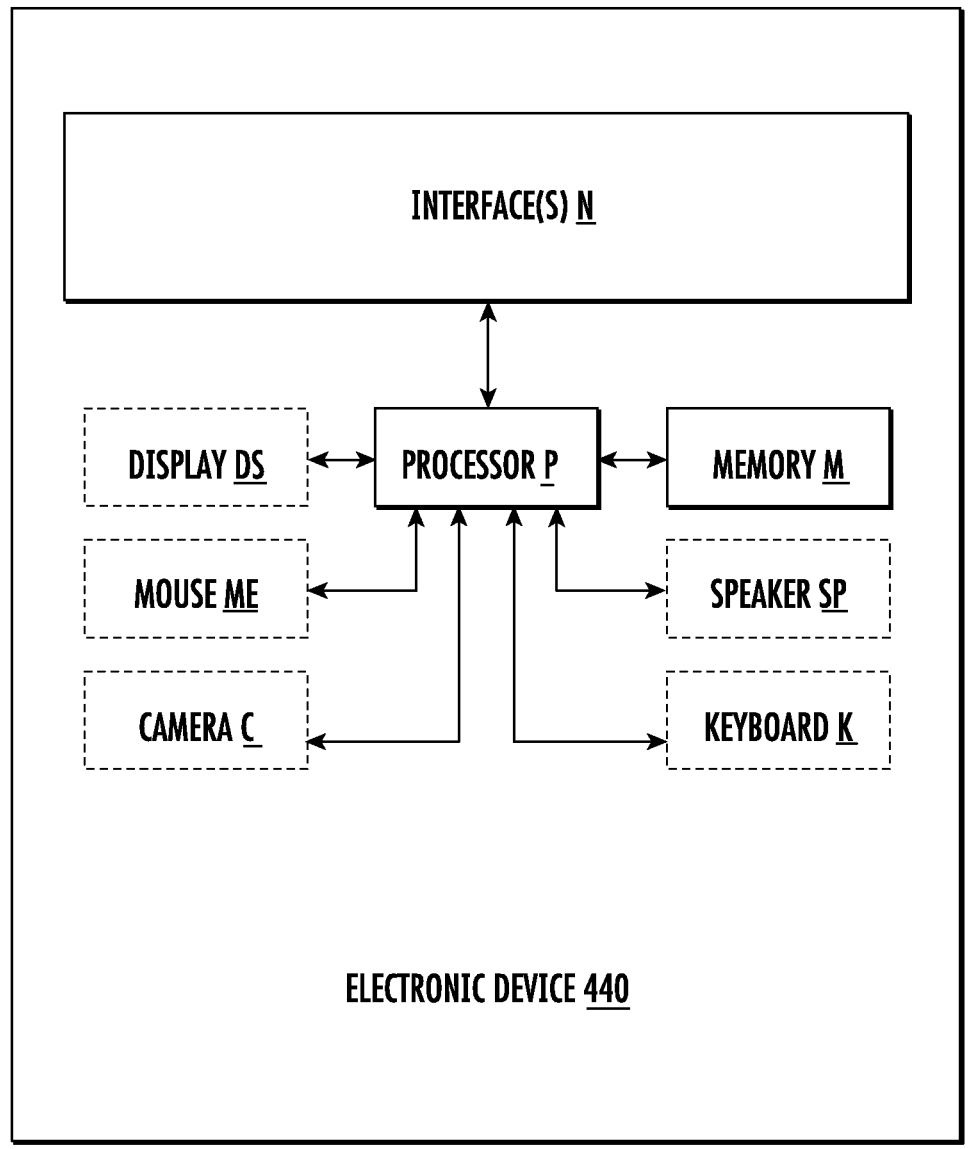
FIG. 5A is a block diagram of an electronic device of FIG. 4.

FIG. 5A is a block diagram of an electronic device 440 (FIG. 4). The electronic device 440 may include a processor P and a memory M. The electronic device 440 may also include interface(s) N and input/output interface(s), such as a display screen DS, a camera C, a mouse ME, a keyboard (or keypad) K, and/or a speaker SP.

In some embodiments, a first electronic device 440-1 (FIG. 4) of a system 400 (FIG. 4) may include the camera C, and a second electronic device 440-2 (FIG. 4) of the system 400 may not include the camera C. The camera C may be any device that captures image data of network equipment 430 (FIG. 4). The camera C may include one or more sensors and one or more lenses on the sensor(s). For example, the sensor(s) may include one or more image sensors that are configured to capture two-dimensional (2D) images, such as photographs.

The processor P may be coupled to the interface(s) N, which may include wired and/or wireless interfaces. The processor P may be configured to communicate with an instrument 410 (FIG. 4), an RF switch 420 (FIG. 4), the network equipment 430, and/or another electronic device 440 via the interface(s) N. For example, the interface(s) N may include short-range wireless communications circuitry, such as Wi-Fi circuitry and/or BLUETOOTH® circuitry. Moreover, the interface(s) N may include a wired interface such as a wired (e.g., Ethernet) Local Area Network ("LAN") interface, a USB interface, or a serial interface.

In some embodiments, the display screen DS may comprise a touchscreen display. For example, the electronic device 440 may be a handheld portable electronic device, such as a smartphone or a tablet computer, that may be held by a user. Alternatively, the electronic device 440 may be a desktop computer or laptop computer.

Figure 5B:
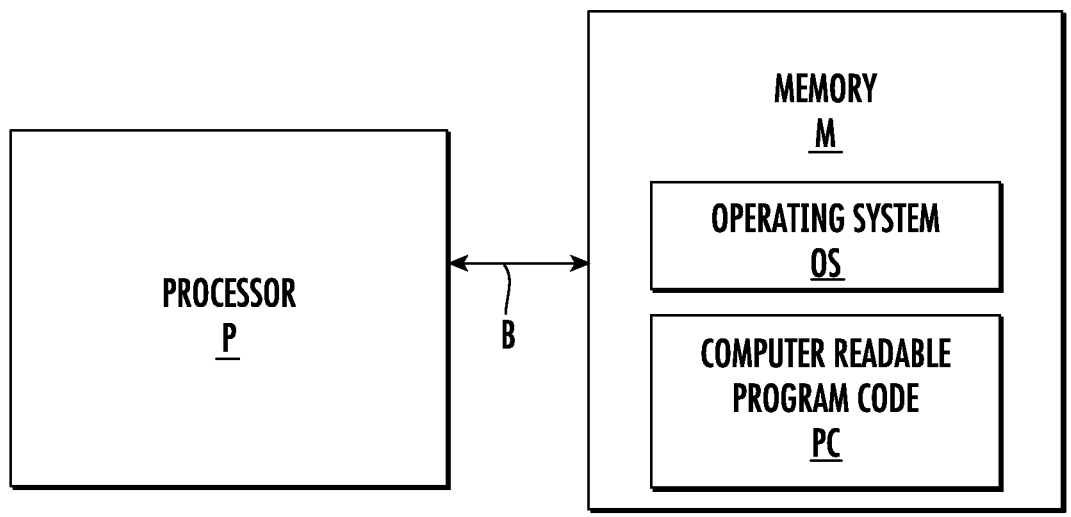
FIG. 5B is a block diagram that illustrates details of an example processor and memory that may be used in the electronic device of FIG. 5A.

FIG. 5B is a block diagram that illustrates details of an example processor P and memory M that may be used in accordance with various embodiments. The processor P communicates with the memory M via an address/data bus B. The processor P may be, for example, a commercially available or custom microprocessor. Moreover, the processor P may include multiple processors. The memory M may be a non-transitory computer readable storage medium and may be representative of the overall hierarchy of memory devices containing the software and data used to implement various functions of an electronic device 440 as described herein. The memory M may include, but is not limited to, the following types of devices: cache, ROM, PROM, EPROM, EEPROM, flash, Static RAM (SRAM), and Dynamic RAM (DRAM).

As shown in FIG. 5B, the memory M may hold various categories of software and data, such as computer readable program code PC and/or an operating system OS. The operating system OS controls operations of an electronic device 440. In particular, the operating system OS may manage the resources of the electronic device 440 and may coordinate execution of various programs by the processor P. For example, the computer readable program code PC, when executed by a processor P of the electronic device 440, may cause the processor P to perform any of the operations illustrated in the flowcharts of FIGS. 10A to 10H. In some embodiments, different electronic devices 440 may perform different ones of the operations illustrated in the flowcharts of FIGS. 10A to 10H. Also, the first electronic device 440-1 may, in some embodiments, have a less powerful processor P than the second electronic device 440-2, and may otherwise be a more basic computing device.

Moreover, an electronic device 440 may, in some embodiments, display (via a display screen DS) a software application to a human user (e.g., an installer or test operator) to guide the user through a cable 300 (FIG. 3A, 3B, or 4) connection process in real-time and/or to confirm that the cables 300 have been correctly connected. For example, the software application may be operated by the electronic device 440 using computer readable program code PC and may control one or more image recognition operations described herein.

Figure 6:
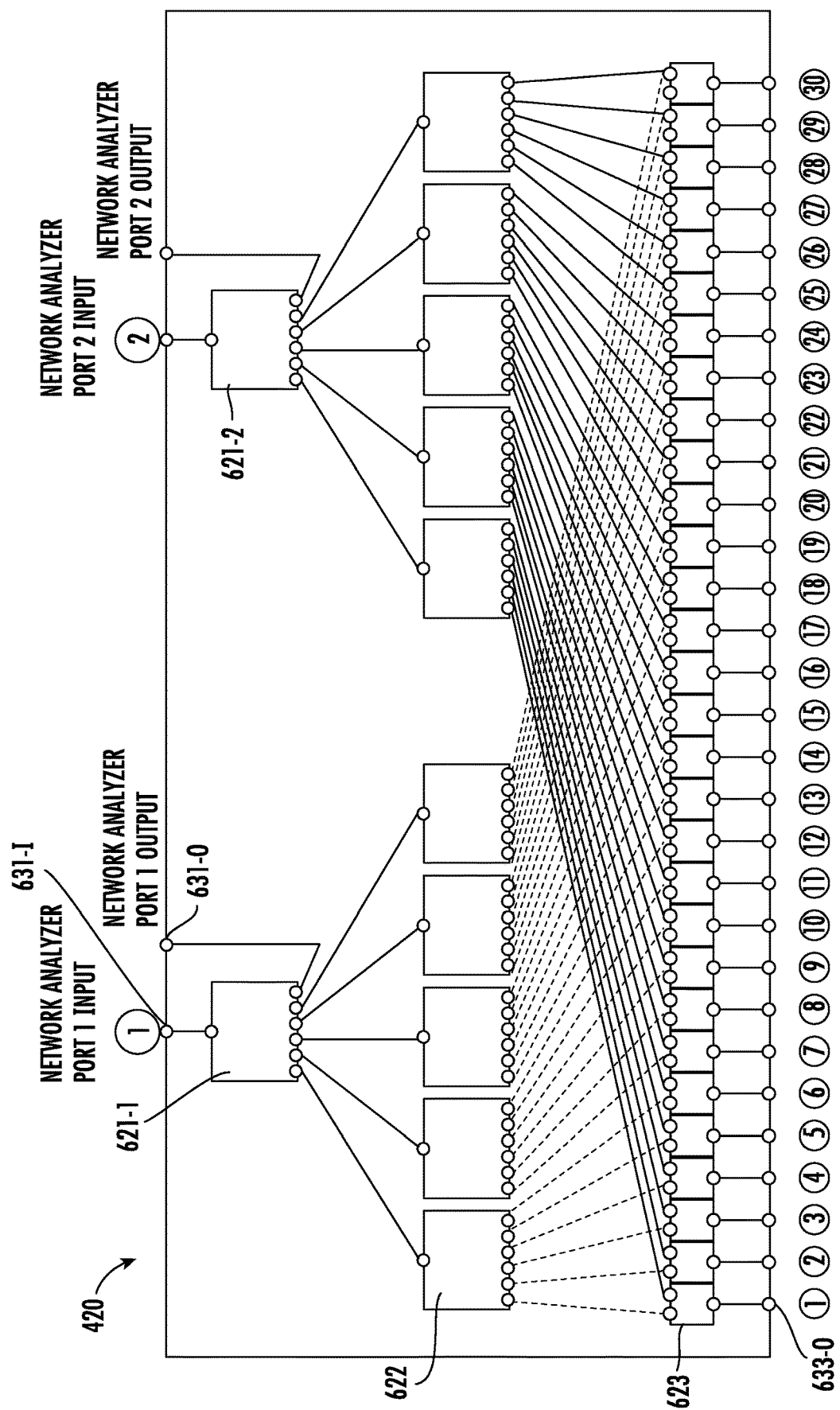
FIG. 6 is a schematic block diagram of the RF switch of FIG. 4.

FIG. 6 is a schematic block diagram of an RF switch 420 (FIG. 4). The switch 420 may include multiple levels of switching circuitry, which may be used to automatically connect telecommunications network equipment 430 (FIG. 4) to an RF instrument 410 (FIG. 4). For example, the switch 420 may be a 2×30 switch having two inputs 631-I at first and second switch circuits 621-1 and 621-2, respectively, and thirty outputs 633-O at respective switch circuits 623. The outputs 633-O may be coupled to respective cables 300 (FIG. 4), and the inputs 631-I may be coupled to respective ports of a network analyzer 410N (FIG. 4). Accordingly, the switch 420 can direct either of the ports of the network analyzer 410N to any of the thirty outputs 633-O.

The switch circuits 621 may be, for example, SP4T or SP6T RF switch integrated circuits. Also, the switch circuits 623 may be, for example, Single-Pole, Double-Throw ("SPDT") RF switch integrated circuits. Moreover, a middle level of switch circuits 622, which may be connected between the switch circuits 621 and the switch circuits 623, may be, for example, SP6T or SP8T RF switch integrated circuits.

In some embodiments, each of the switch circuits 621 has an output 631-O that can be used to daisy-chain multiple switches. The switch 420 may thus be connected to one or more additional RF switches via the outputs 631-O.

Figure 7A:
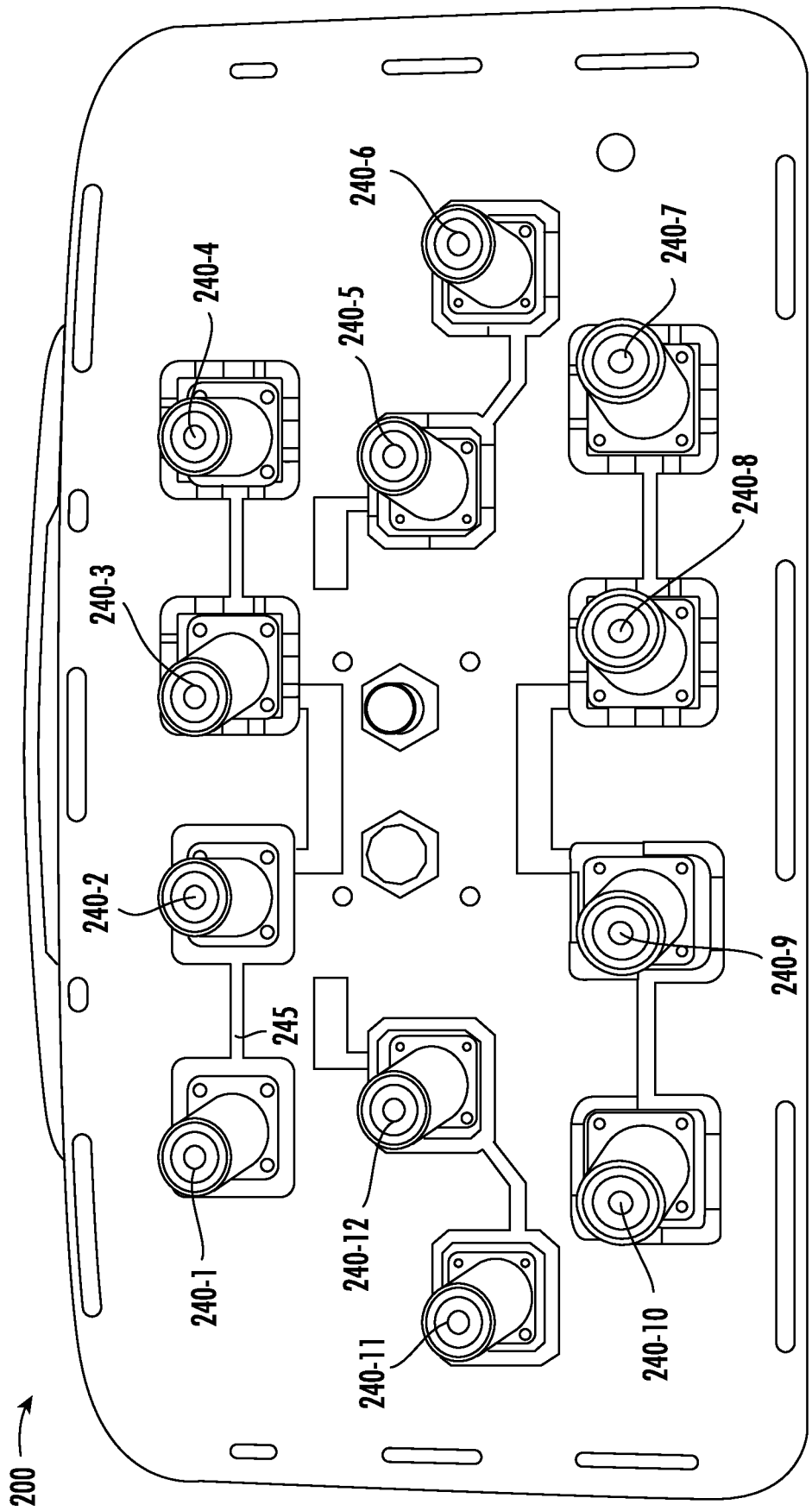

FIG. 7A-7D illustrate a sequence of operations of detecting antenna ports 240 (FIG. 2) and detecting cables 300 (FIG. 3A, 3B, or 4) connected to the ports 240. As shown in FIG. 7A, the ports 240 may be disconnected from any cables 300 when a camera C (FIG. 5A) captures one or more initial images of the ports 240. In addition to capturing the ports 240, images captured by the camera C may include visual indicators 245 that are on a surface (e.g., a bottom end cap 230 (FIG. 2)) of an antenna 200 (FIG. 2). For example, pairs of ports 240 may have respective indicators 245 that distinguish each pair from the others. As an example, each indicator 245 may have a unique line pattern (e.g., a solid-line pattern or one of various broken-line patterns) that extends around its pair of ports 240. Moreover, the color of an indicator 245 may be captured by the camera C to help distinguish the indicator 245.

For simplicity of illustration, the antenna 200 is shown in FIG. 7A as having twelve ports 240-1 through 240-12. Similarly, the antenna 200 of FIGS. 7B-7D includes the eight ports 240-1 through 240-8 of FIG. 3B. In some embodiments, however, the antenna 200 may have thirty or more ports 240.

Figure 7B:
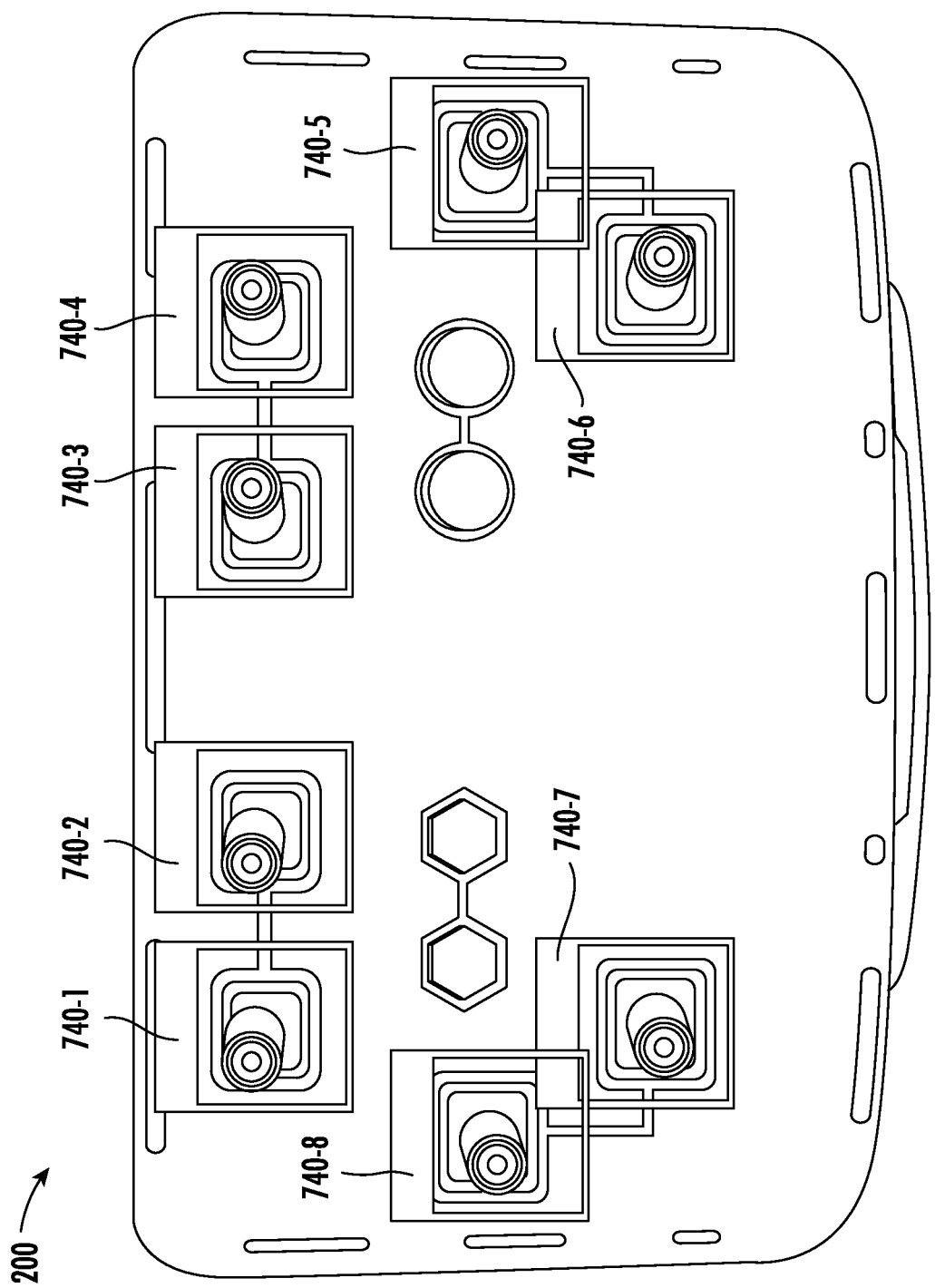

As shown in FIG. 7B, a first electronic device 440-1 (FIG. 4) can perform image recognition of image data generated by the camera C to identify the ports 240. For example, the electronic device 440-1 can generate digital designators 740-1 through 740-8 indicating positions on the antenna 200 that correspond to respective ports 240-1 through 240-8 (FIG. 3B). In some embodiments, each designator 740 may appear on a display screen DS of the electronic device 440-1 in real-time as the electronic device 440-1 detects a corresponding port 240. As an example, the electronic device 440-1 may compare the image-captured shape/location of a port 240 with a predetermined port shape/location (e.g., based on the known model of the antenna 200) to determine a level of confidence that the port 240 is a port of the antenna 200. The corresponding designator 740 may thus display the confidence level as a numerical value (e.g., 99%). Moreover, detection of a visual indicator 245 (FIG. 7A) on a surface of the antenna 200 may increase the confidence level.

Figure 7C:
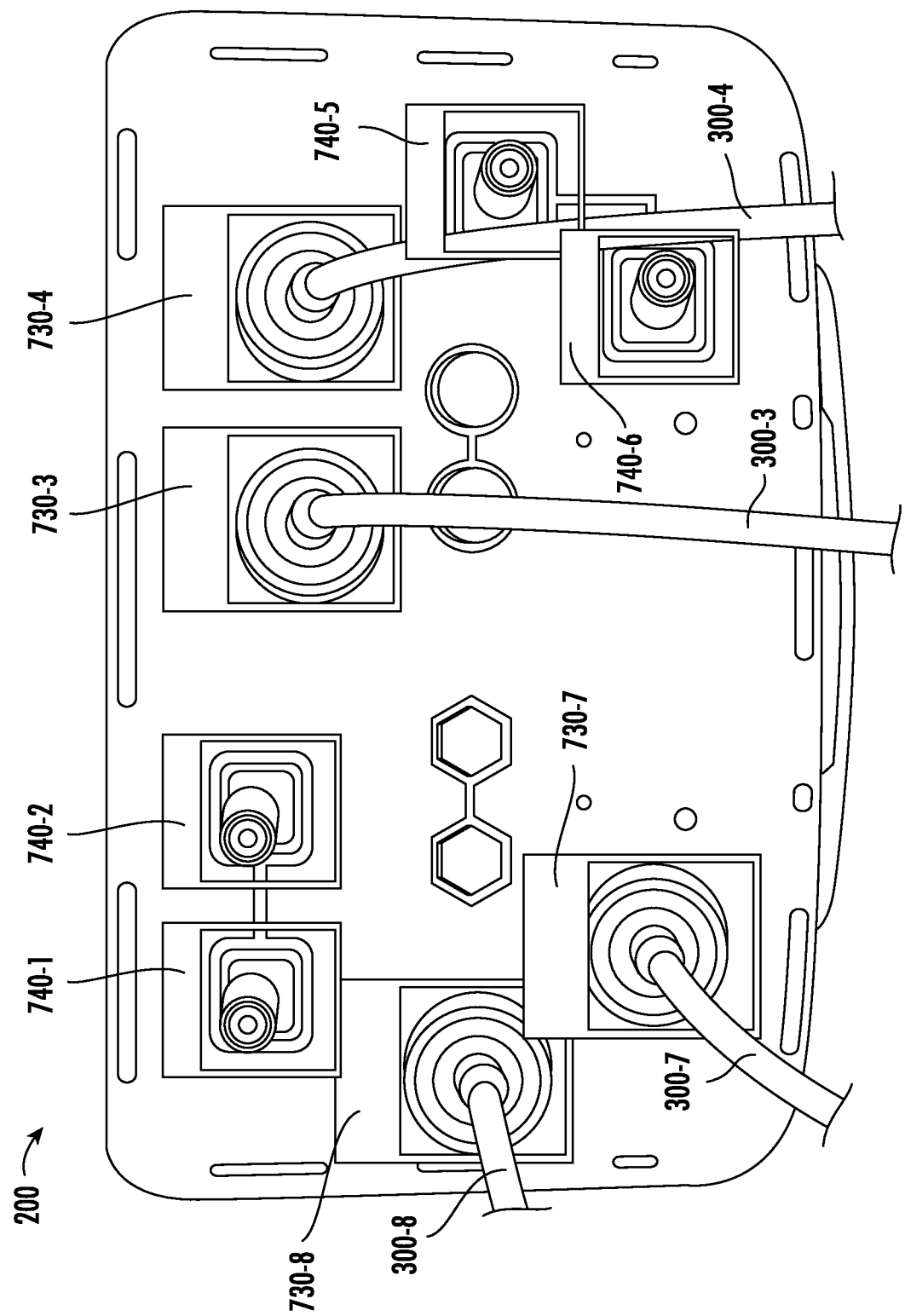

Next, as shown in FIG. 7C, a person can manually connect cables 300 to the ports 240 while the camera C continues (e.g., automatically and continuously) capturing image data of the ports 240. Similar to generation of the port designators 740, the electronic device 440-1 can perform image recognition to generate digital designators 730 that indicate positions on the antenna 200 where cables 300 are connected. For example, designators 730-3, 730-4, 730-7, and 730-8 indicate that the electronic device 440-1 has detected the cables 300-3, 300-4, 300-7, and 300-8 at positions of the ports 240-3, 240-4, 240-7, and 240-8, respectively. In some embodiments, the designators 730, like the designators 740, may include a numerical value of a confidence level that a cable 300 is at a port 240.

After all of the ports 240 are connected to cables 300, a second electronic device 440-2 (FIG. 4) can automatically configure an RF switch 420 (FIG. 4) for a test of the antenna 200. For example, designators 730-1 through 730-8 of FIG. 7D indicate that all eight ports 240-1 through 240-8 are connected to respective cables 300-1 through 300-8.

Figure 7E:
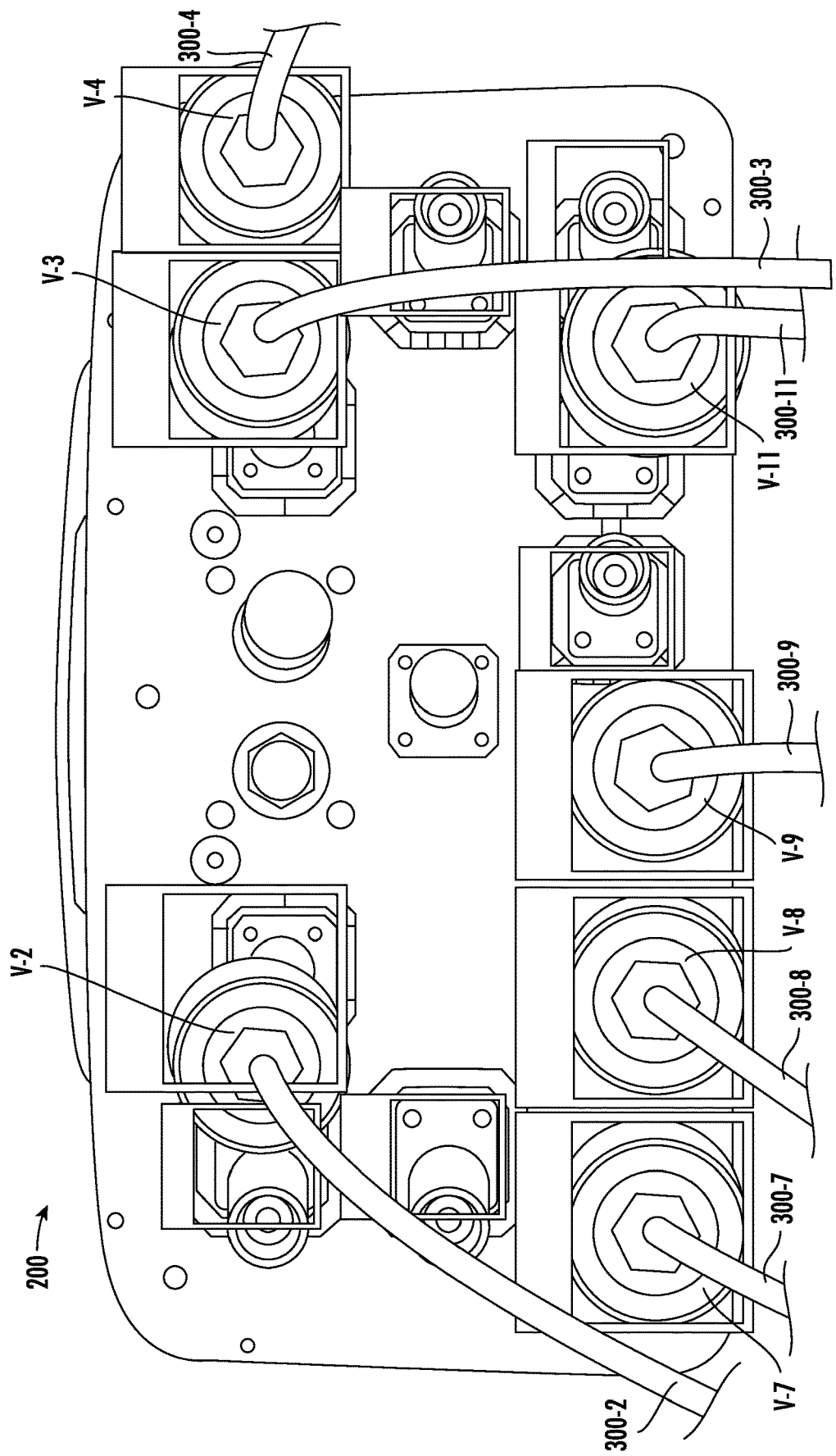

FIG. 7E illustrates visual indicators V on the cables 300. In particular, FIG. 7E shows indicators V-2 through V-4, V-7 through V-9, and V-11 on respective cables 300-2 through 300-4, 300-7 through 300-9, and 300-11 that are connected to an antenna 200. Each indicator V may be unique, which allows the first electronic device 440-1 to distinguish between different indicators V.

Figure 7F:
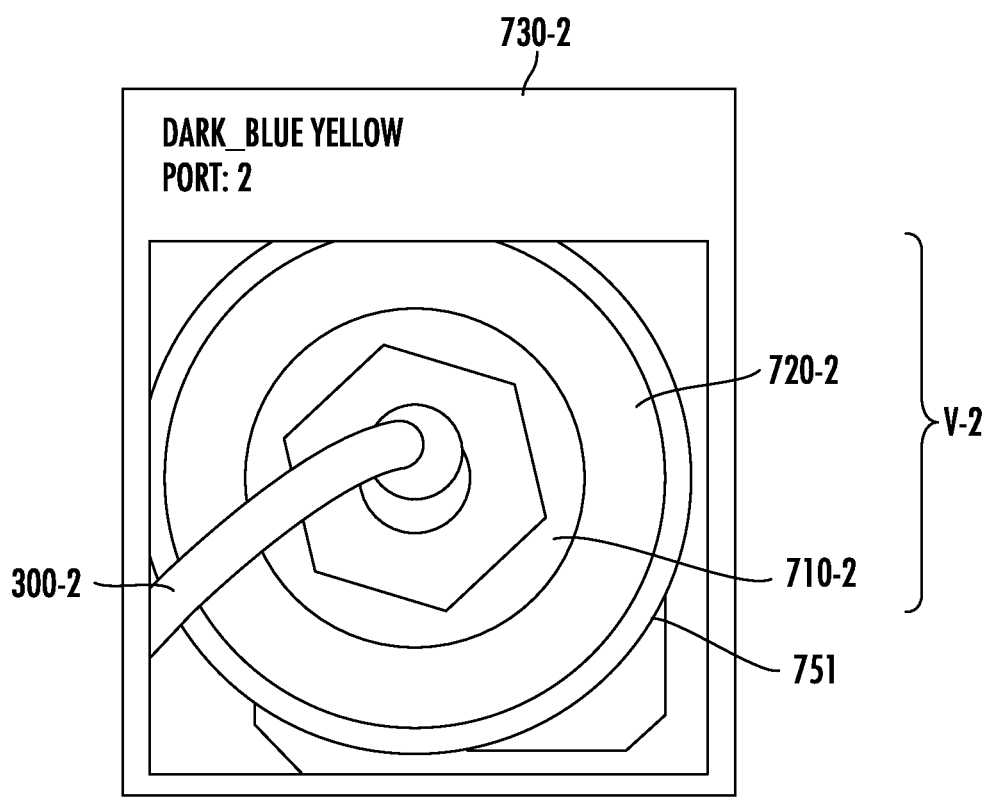

For example, FIG. 7F, which is an enlarged view of the indicator V-2, shows that the indicators V may include different respective colors, or different respective combinations of colors. A color combination of the indicator V-2 includes a first color of an inner ring 710-2 and a second color of an outer ring 720-2. For example, the inner ring 710-2 may be yellow and the outer ring 720-2 may be dark blue. In some embodiments, the rings 710-2 and 720-2 may be concentric rings on a cable collar 751 that can be attached on an end portion of the cable 300-2. As an example, the rings 710-2 and 720-2 may be on a substantially flat surface of the cable collar 751 that the camera C faces when the cable 300-2 is connected to the antenna 200.

Other examples of indicators V include different respective polygonal shapes, different respective barcodes (e.g., 2D barcodes, such as Quick Response ("QR") codes), and different respective strings of alphanumeric characters. As with the rings 710-2 and 720-2, such indicators V may be on respective cable collars 751. Alternatively, an indicator V may be on a surface of a cable 300, such as on a plastic jacket of the cable 300.

In response to identifying each indicator V, the electronic device 440-1 may, in some embodiments, generate a digital designator 730 indicating that the cable 300 is connected to the antenna 200. For example, upon identifying the indicator V-2, the electronic device 440-1 may generate a digital designator 730-2 indicating that the cable 300-2 is connected to port 240-2. In some embodiments, the designator 730-2 may include information about the indicator V-2, such as information indicating the colors that the electronic device 440-1 detects on the indicator V-2. Moreover, the electronic device 440-1 may use one of various color-filtering techniques to detect the colors on the indicator V-2.

In some embodiments, respective cable collars 751 may be on opposite ends of each cable 300. For example, a human installer may use the electronic device 440-1 to detect indicators V on opposite ends of each cable 300 when connecting the cables 300 (e.g., jumper cables) between a radio 342 (FIGS. 3A and 3B) and an antenna 200.

Figure 7G:
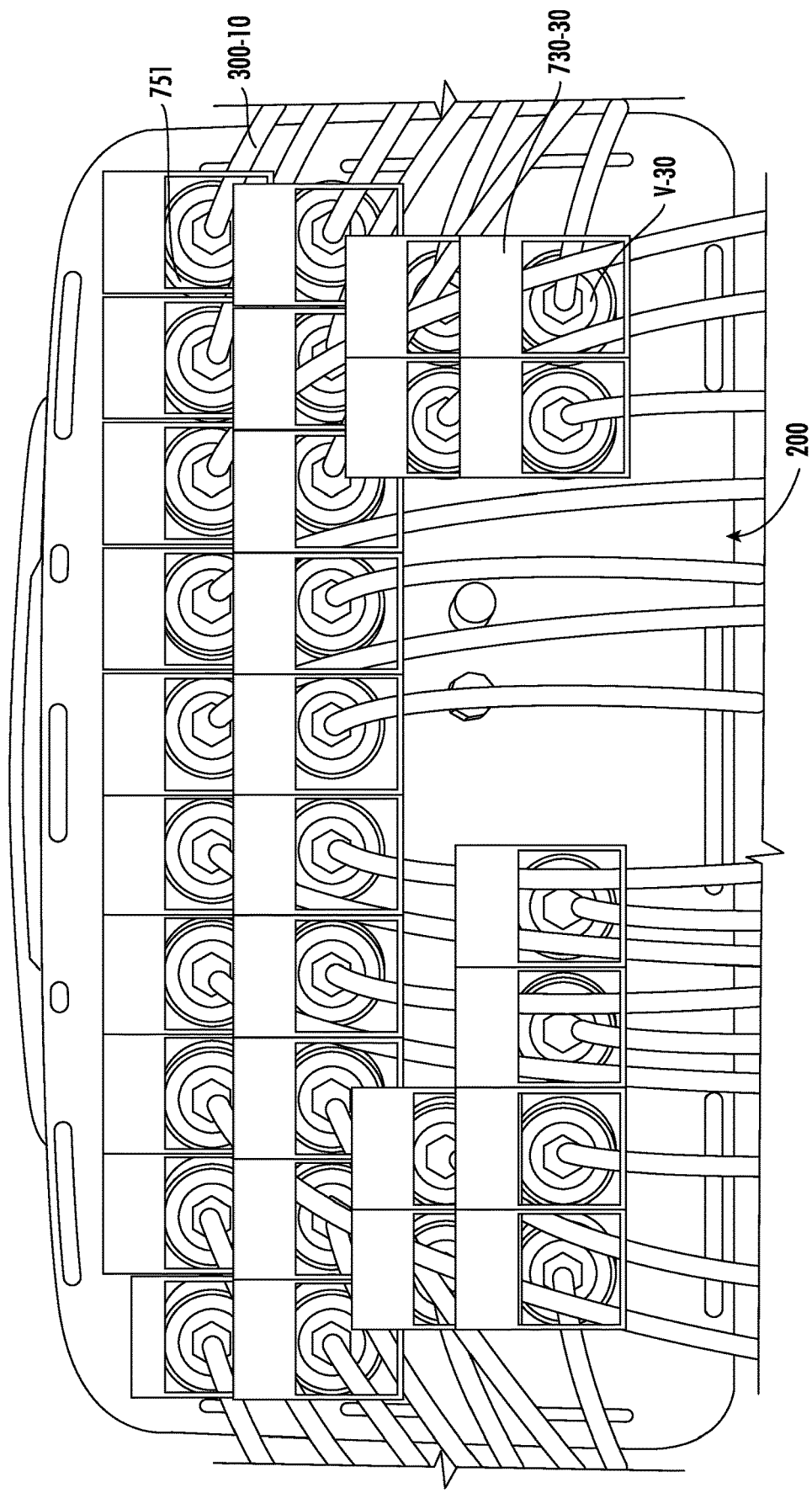

FIG. 7G illustrates an antenna 200 that has thirty ports 240 that are connected to thirty cables 300, respectively. In response to identifying thirty indicators V on the respective cables 300, the electronic device 440-1 may generate thirty designators 730 indicating that the cables 300 are connected to the antenna 200. Accordingly, the antenna 200 is not limited to eight, twelve, or twenty ports 240 that are detectable by the electronic device 440-1, but rather may include thirty or more ports 240 that the electronic device 440-1 can detect.

Figure 8:
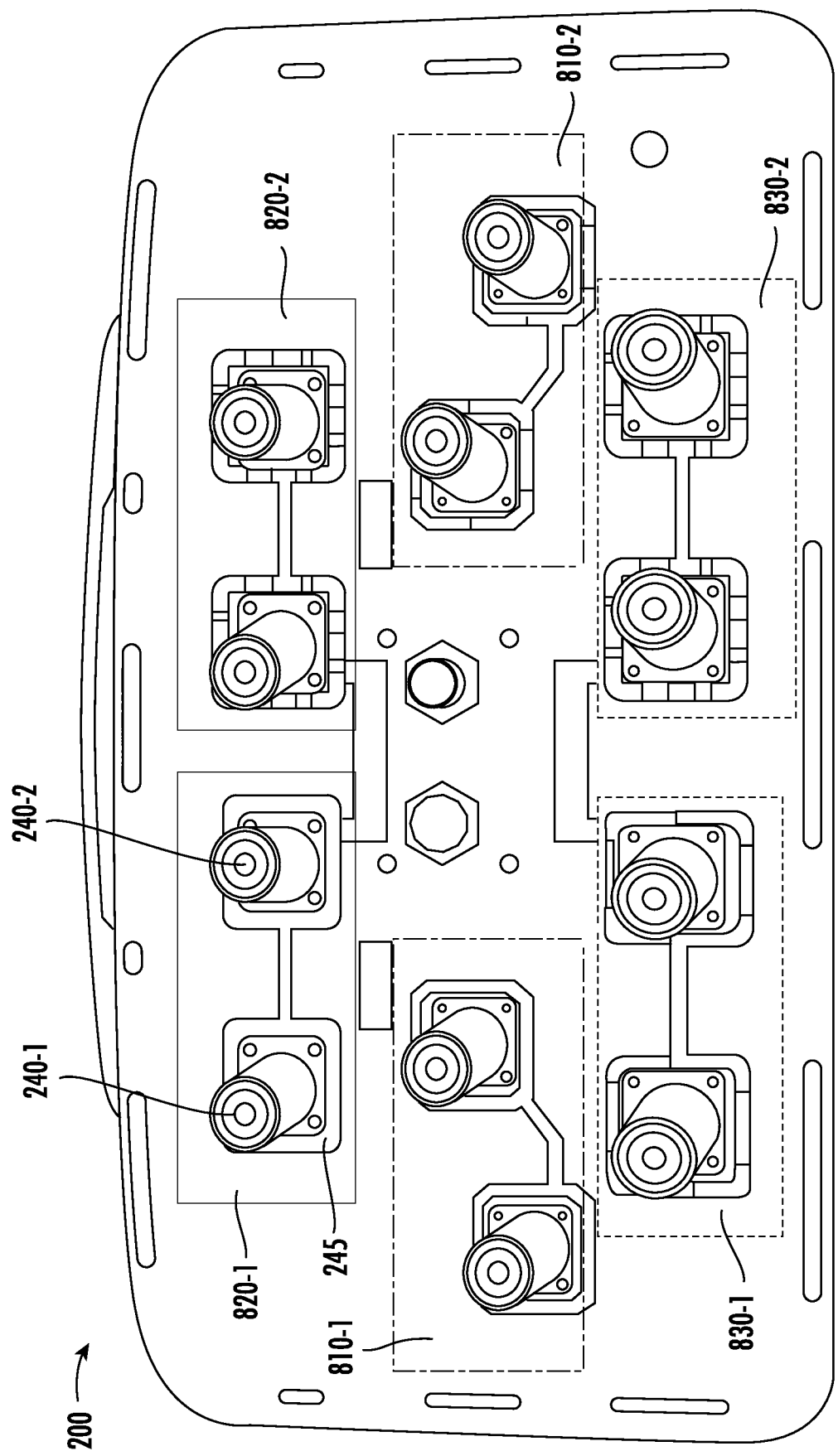
FIG. 8 is a perspective view of frequency groups of antenna ports of FIG. 2.

FIG. 8 illustrates frequency groups 810, 820, and 830 of antenna ports 240. The groups 810, 820, 830 may provide RF signals at different respective frequencies, such as 600 Megahertz (MHz), 1800 MHz, and 2600 MHz. In some embodiments, each group may include multiple pairs of ports 240. For example, a middle-frequency group 820 may include first and second pairs 820-1 and 820-2 of ports 240. Similarly, a low-frequency group 810 may include first and second pairs 810-1 and 810-2 of ports 240, and a high-frequency group 830 may include first and second pairs 830-1 and 830-2 of ports 240.

Each pair may have a unique visual indicator 245 (FIG. 7A) that the electronic device 440-1 can detect. Moreover, multiple indicators 245 within a group may be the same color, which may facilitate accurate connections of the cables 300 to the ports 240 by a human test operator or installer. For example, indicators 245 for the group 820 may be yellow, indicators 245 for the group 810 may be red, and indicators 245 for the group 830 may be orange. As an example, an indicator 245 for the first pair 820-1 may have a solid yellow line and an indicator 245 for the second pair 820-2 may have a broken yellow line.

Figure 9:
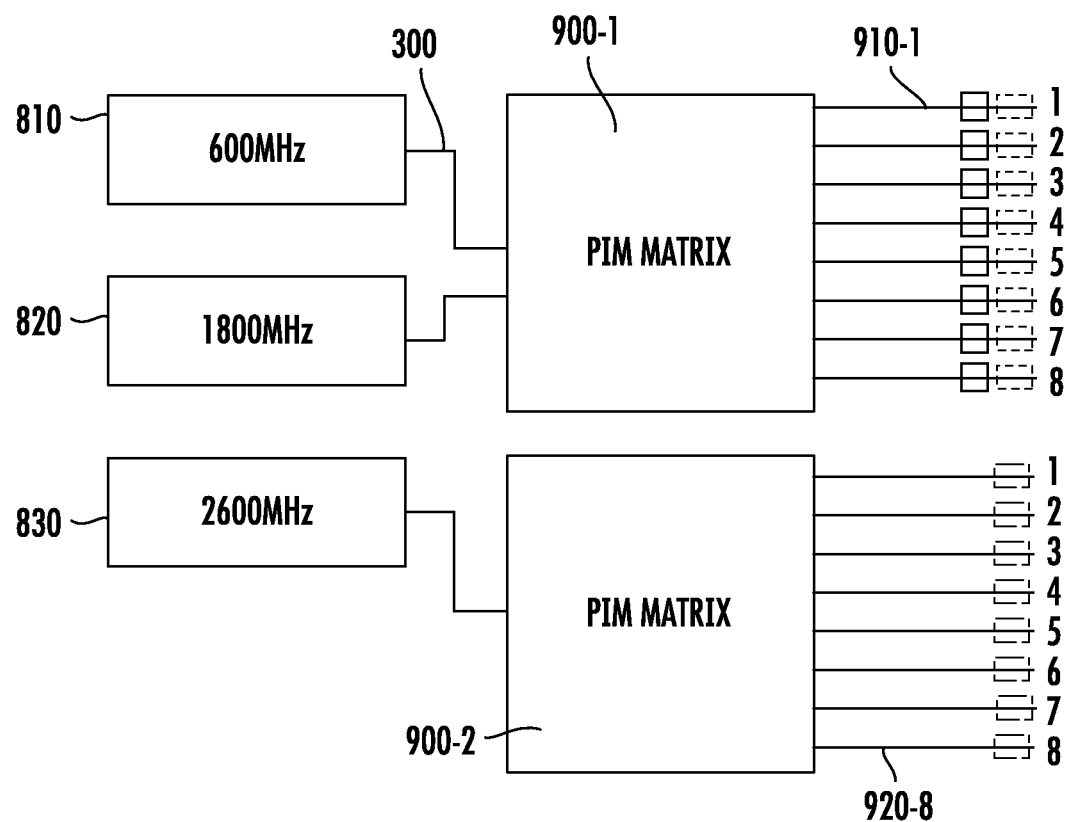
FIG. 9 is a schematic block diagram of the frequency groups of FIG. 8.

FIG. 9 is a schematic block diagram of frequency groups 810, 820, and 830 (FIG. 8) connected to PIM matrixes 900. An RF instrument 410 (FIG. 4) may use the PIM matrixes 900 to perform PIM testing of the antenna 200 (FIG. 8) that has the frequency groups 810, 820, and 830. For example, the PIM matrixes 900 may be respective RF switches that are connected to the instrument 410, which may be configured to perform PIM testing of the antenna 200. As an example, first and second PIM matrixes 900-1 and 900-2 may be respective 2×8 RF switches. Accordingly, the first PIM matrix 900-1 may have eight outputs 910 coupled to the instrument 410, and the second PIM matrix 900-2 may have eight outputs 920 coupled to the instrument 410. The use of multiple PIM matrixes 900, rather than a single large RF switch, may be beneficial because PIM testing may not be as flexible as other tests on the antenna 200.

A human test operator may be responsible for connecting every port 240 of the antenna 200 to the PIM matrixes 900, and for ensuring that each cable 300 therebetween is connected to the correct frequency group. For example, if a port 240 is to be tested at a frequency of the group 820, then that port 240 should be connected to a cable 300 that is designated (e.g., as indicated by a visual indicator V (FIG. 7E) and/or by a color of a plastic jacket of the cable 300) for that group 820. Image recognition according to the present inventive concepts can help the test operator by confirming that each cable 300 is connected to the correct frequency group.

In some embodiments, a system 400 (FIG. 4) may detect the respective cable 300 that is connected to each port 240 on the antenna 200 and may responsively (i.e., automatically) direct PIM testing using the PIM matrixes 900. For example, a first electronic device 440-1 (FIG. 4) may detect the cable 300 connections, and a second electronic device 440-2 (FIG. 4) may trigger the PIM testing. Moreover, the first electronic device 440-1 may verify that the cables 300 are connected to the ports 240 in a predetermined arrangement. As an example, the first electronic device 440-1 may compare visual indicators V (FIG. 7E) that it detects on respective cable collars 751 (FIG. 7F) with a predetermined mapping of the cables 300 to the ports 240.

Figure 10A:
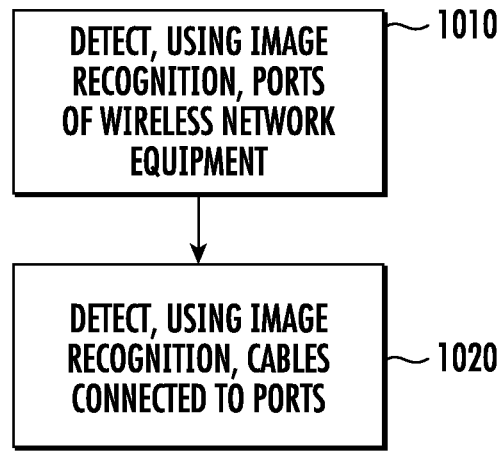
FIGS. 10A-10H are flowcharts illustrating operations including detecting cables connected to telecommunications network equipment, according to embodiments of the present inventive concepts.

FIGS. 10A-10H are flowcharts illustrating operations including detecting cables 300 connected to telecommunications network equipment 430. As shown in FIG. 10A, the operations may include using image recognition to detect (Block 1010) ports 240 (FIG. 2) of wireless telecommunications network equipment 430W (FIG. 4). For example, respective positions of the ports 240 may be detected relative to each other before cables 300 (FIGS. 3A and 3B) are connected to the ports 240. Moreover, the operations may include using image recognition to detect (Block 1020) the cables 300 as, and/or after, they are connected to the ports 240.

In some embodiments, a first electronic device 440-1 (FIG. 4) may perform the operations of FIG. 10A. Moreover, in some embodiments, the first electronic device 440-1 may capture images of the equipment 430W and may transmit image data to the cloud (i.e., one or more servers that are remote to the first electronic device 440-1) for image processing. Accordingly, the cloud may perform the image recognition operations of FIG. 10A and may transmit results of the image recognition operations to the first electronic device 440-1, which may then display the results to a human user of the first electronic device 440-1.

Figure 10B:
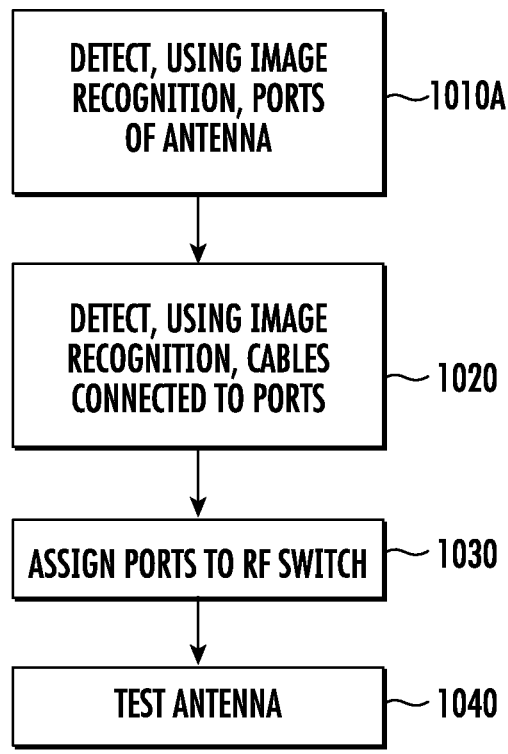

Referring to FIG. 10B, the equipment 430W may be an antenna 200 (FIG. 2). Accordingly, detecting (Block 1010) ports 240 may include detecting (Block 1010A) ports 240 of the antenna 200. In some embodiments, this may begin upon placement of the antenna 200 on a table 405 (FIG. 4), which may be a test bench. For example, the first electronic device 440-1 may use image recognition software along with a camera C (FIG. 5A) to detect the antenna 200 and each of its ports 240.

Moreover, in response to detecting (Block 1020) cable 300 connections at the ports 240, a system 400 (FIG. 4) may assign (Block 1030) the ports 240 to an RF switch 420 (FIG. 4). For example, the system 400 may include a second electronic device 440-2 (FIG. 4) that assigns the ports 240. In some embodiments, the second electronic device 440-2 may trigger testing (Block 1040) of the antenna 200 by an RF instrument 410 (FIG. 4) that uses the switch 420 to connect to the antenna 200.

Figure 10C:
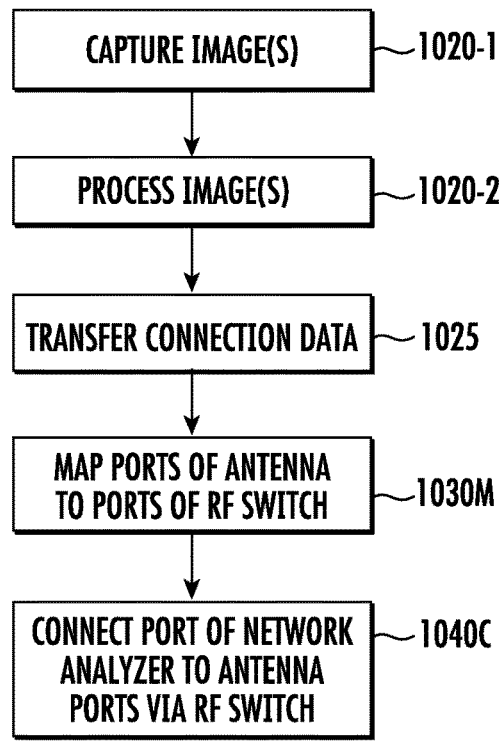

As shown in FIG. 10C, detecting (Block 1020) cable 300 connections may include capturing (Block 1020-1) image data of cables 300 that are connected to ports 240 of the antenna 200. For example, the first electronic device 440-1 may control a camera C to capture at least one image of the antenna 200. Moreover, detecting (Block 1020) cable 300 connections may include processing (Block 1020-2) the image(s) to generate data regarding the cable 300 connections. Such image processing may be performed by the first electronic device 440-1 and/or performed remotely by the cloud and then communicated to the first electronic device 440-1. Accordingly, the first electronic device 440-1 may, in some embodiments, receive data from the cloud regarding image recognition results (e.g., data that identifies detected ports 240 and/or detected cable 300 connections). In some embodiments, the first electronic device 440-1 may use image recognition to generate the connection data, and/or may transfer (Block 1025) the connection data within the system 400, such as by transmitting the connection data to the second electronic device 440-2.

FIG. 10C also shows that assigning (Block 1030) the ports 240 to the switch 420 may include mapping (Block 1030M) the ports 240 to ports of the switch 420. For example, the second electronic device 440-2 may assign a first port 240-1 of the antenna 200 to a seventh port of the switch 420, a second port 240-2 of the antenna 200 to a third port of the switch 420, and so forth until every port 240 of the antenna 200 is mapped to a respective port of the switch 420. In particular, the second electronic device 440-2 may use data regarding detection of the ports 240 and/or connection data regarding the cables 300 that it receives from the first electronic device 440-1 to map the ports 240. The second electronic device 440-2 may also use information regarding the model of the antenna 200 when mapping ports 240 to the switch 420, as different antennas may have different port layouts. Moreover, testing (Block 1040) the antenna 200 may include connecting (Block 1040C) a first port or a second port of the instrument 410 (e.g., a network analyzer 410N) to the ports 240 via the switch 420.

Figure 10D:
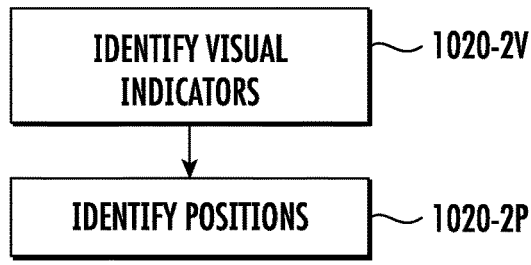

Referring to FIG. 10D, processing (Block 1020-2) the image(s) may include identifying (Block 1020-2V) different visual indicators V (FIG. 7E) on the cables 300. Moreover, processing (Block 1020-2) the image(s) may include identifying (Block 1020-2P) different respective positions of the cables 300 on the antenna 200. For example, detected positions of the indicators V may be used to identify positions of the cables 300 relative to each other and/or relative to the ports 240.

Figure 10E:
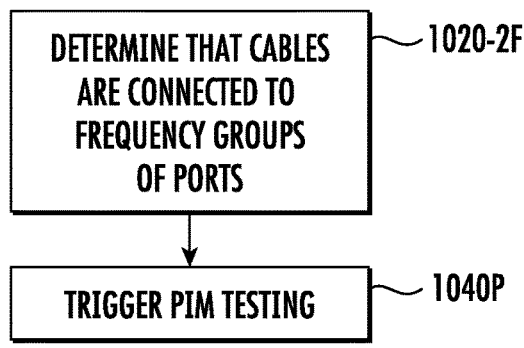

In some embodiments, as shown in FIG. 10E, processing (Block 1020-2) the image(s) may include determining (Block 1020-2F), such as verifying, that the cables 300 are connected to corresponding frequency groups 810, 820, and 830 (FIG. 8) of the ports 240. In response, the second electronic device 440-2 may trigger testing (Block 1040), such as PIM testing (Block 1040P), of the antenna 200.

Figure 10F:
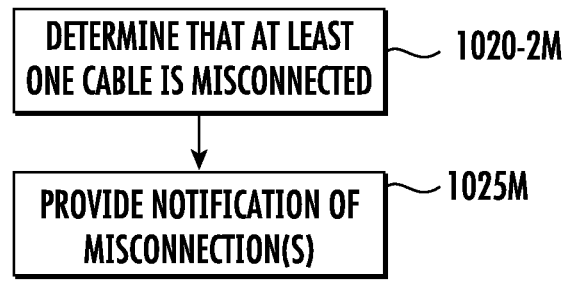

Referring to FIG. 10F, processing (Block 1020-2) the image(s) may include determining (Block 1020-2M) that at least one cable 300 is misconnected to the antenna 200. In response, the first electronic device 440-1 may provide (Block 1025M) a user notification of the misconnection(s). For example, the first electronic device 440-1 may provide the notification via a display screen DS (FIG. 5A) and/or speaker SP (FIG. 5A) of the first electronic device 440-1. As another example, the first electronic device 440-1 may transmit the notification within or outside of the system 400 via an interface N (FIG. 5A) of the first electronic device 440-1.

Figure 10G:
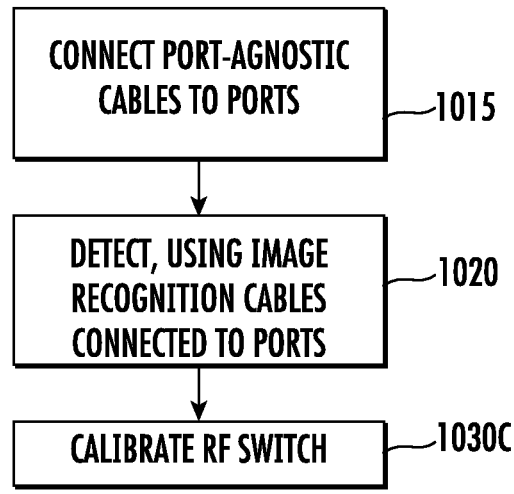

As shown in FIG. 10G, the system 400 may be used to configure an RF switch 420. For example, after the first electronic device 440-1 detects (Block 1010) the ports 240, a human test operator may connect (Block 1015) the cables 300 to the ports 240. In some embodiments, the cables 300 may be port-agnostic cables that can each be connected to any of the ports 240. The cables 300 thus may not necessarily be assigned to predetermined ones of the ports 240. Accordingly, a human test operator can quickly connect the cables 300 to the ports 240 in any arrangement, without needing to manually match the cables 300 to the ports 240 in a predetermined arrangement.

Because an RF switch 420 used for return loss, isolation, and pattern testing can connect either port of a network analyzer 410N to any port 240 of the antenna 200, the antenna 200 may be tested with any configuration and in any orientation, as long as connections between the cables 300 and the ports 240 are tracked. Accordingly, the present inventive concepts may use a vision system that automatically detects where each cable 300 is on the antenna 200. Each cable 300, and/or each port 240, may have a unique visual identifier that image detection software can identify. This information can then be provided to testing software that the system 400 uses before a test to configure a pattern of the switch 420.

The first electronic device 440-1 may detect (Block 1020) each cable 300 connection in real-time as a person connects the cables 300 to the ports 240, and/or may detect the connections after all (or after one or more groups) of the cables 300 are connected. Moreover, assigning (Block 1030) the ports 240 to an RF switch 420 may include controlling calibration (Block 1030C) of the switch 420, which is connected to at least one of the cables 300. For example, the second electronic device 440-2 may calibrate the switch 420 in response to receiving data from the first electronic device 440-1 regarding the connections. After calibrating the switch 420, the cables 300 may be assigned to specific ports of the switch 420.

Before calibrating the switch 420, however, the cables may be port-agnostic with respect to the ports of the switch and with respect to the ports 240 of the antenna 200. Conventionally, a human test operator must connect a specific cable 300 among a bundle of cables 300 to calibrate the switch 420. By contrast, the present inventive concepts allow the test operator to connect any cable 300 in the bundle to a port 240 and let the system 400 automatically detect which cable 300 is connected. This saves the test operator time that would otherwise be spent finding specific cables 300 in the bundle.

Figure 10H:
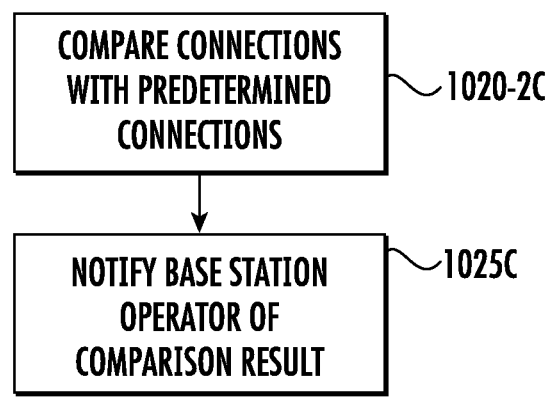

Referring to FIG. 10H, processing (Block 1020-2) the image(s) may include comparing (Block 1020-2C) the cable 300 connections with predetermined connections for the antenna 200. In response to a result of the comparison, the system 400 may notify (Block 1025C) an operator of a base station of the result. For example, the first electronic device 440-1 and/or the second electronic device 440-2 may transmit a notification over a wireless (e.g., cellular) network to the operator and/or may display a notification on a display screen DS (FIG. 5A) of the first electronic device 440-1. In some embodiments, the operator (e.g., an installer) may use the first electronic device 440-1 to (i) capture photographs of one or more components on a cellular tower, (ii) perform image recognition to construct a wiring diagram for the component(s), (iii) compare the wiring diagram to a predetermined wiring diagram, and then (iv) notify the operator by displaying a result of the comparison on the display screen DS.

Though some of the flowcharts are discussed with respect to an antenna 200, the antenna 200 is provided as an example of telecommunications network equipment 430 to which operations in the flowcharts may be applied. Accordingly, the operations may be applied to (e.g., repeated for or used instead for) other equipment 430, such as a cellular radio 342 (FIGS. 3A and 3B). For example, the operations may be used to detect cable 300 connections to the radio 342 and/or to test performance of the radio 342. Moreover, the operations may, in some embodiments, be performed in the field with respect to jumper cables for a cellular base station. As an example, the operations may be performed by an electronic device 440 at or near (e.g., within one hundred feet of) the base station. The present inventive concepts can thus help to reduce installation errors when connecting cables 300 (e.g., jumper cables) between the radio 342 and the antenna 200.

A system 400 (FIG. 4) that uses image recognition to detect connections of cables 300 to respective ports 240 of telecommunications network equipment 430 according to embodiments of the present inventive concepts may provide a number of advantages. These advantages include faster and/or more accurate cable 300 connections by a human operator (e.g., an installer connecting a radio 342 (FIGS. 3A and 3B) to an antenna 200 (FIGS. 3A and 3B)), even with a large number (e.g., twenty, thirty, or more) of cable 300 connections per unit of equipment 430. The present inventive concepts can thus save operator time and reduce potential failures of equipment 430.

In some embodiments, the system 400 may capture successive images of a test bench. Upon detecting the antenna 200, the system 400 may use a neural network and machine learning to identify ports 240 of the antenna 200 and test leads (e.g., cables 300). In some embodiments, once the system 400 detects a test lead, the system 400 may determine a unique identifier of the test lead by using color filtering. The system 400 may use image recognition software to calculate a location of the unique identifier on the antenna 200 and a corresponding port 240. In response to detecting all of the test leads, the system 400 may configure an RF switch 420 (FIG. 4) and set frequencies for the ports 240. Accordingly, the system 400 allows a human test operator to quickly connect the antenna 200 (or other equipment 430) for testing without the operator needing to have knowledge of the antenna 200 or how it needs to be connected or tested. The system 400 may also reduce errors during factory tests and may not have to rely on the experience of the operator to ensure proper testing. Moreover, the system 400 can be used to verify connections before a test in which multiple RF instruments 410 (FIG. 4) are connected to an antenna 200.

The present inventive concepts have been described above with reference to the accompanying drawings. The present inventive concepts are not limited to the illustrated embodiments. Rather, these embodiments are intended to fully and completely disclose the present inventive concepts to those skilled in this art. In the drawings, like numbers refer to like elements throughout. Thicknesses and dimensions of some components may be exaggerated for clarity.

Spatially relative terms, such as "under," "below," "lower," "over," "upper," "top," "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the example term "under" can encompass both an orientation of over and under. The device may be otherwise oriented (rotated 90 degrees or at other orientations) and the spatially relative descriptors used herein interpreted accordingly.

Herein, the terms "attached," "connected," "interconnected," "contacting," "mounted," and the like can mean either direct or indirect attachment or contact between elements, unless stated otherwise.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the present inventive concepts. As used herein, the singular forms "a," "an," and "the" are intended to include the plural forms as well, unless the context clearly indicates otherwise. It will be further understood that the terms "comprises," "comprising," "includes," and/or "including" when used in this specification, specify the presence of stated features, operations, elements, and/or components, but do not preclude the presence or addition of one or more other features, operations, elements, components, and/or groups thereof.

That which is claimed is:

1. A method of configuring a radio frequency (RF) switch, the method comprising:
   detecting, using image recognition, connections of cables to respective ports of an antenna;
   assigning the ports of the antenna to the RF switch based on the connections of cables to the respective ports of the antenna, in response to the detecting the connections of the cables to the respective ports of the antenna using the image recognition; and
   testing the antenna, using the RF switch.

2. The method of claim 1, wherein the testing comprises return loss testing, isolation testing, and radiation pattern testing.

3. The method of claim 1, further comprising:
   transmitting data regarding the connections of the cables from a first electronic device to a second electronic device, in response to the detecting.

4. The method of claim 3,
   wherein the detecting comprises controlling, via the first electronic device, a camera to capture at least one image of the antenna,
   wherein the detecting further comprises processing, via the first electronic device, the at least one image of the antenna to generate the data regarding the connections of the cables, and
   wherein the assigning comprises mapping, via the second electronic device, the ports of the antenna to ports of the RF switch, using the data regarding the connections of the cables.

5. The method of claim 1, wherein the testing comprises connecting a first port and a second port of a network analyzer to respective ones of the ports of the antenna via the RF switch.

6. The method of claim 1, further comprising:
   detecting a respective position on the antenna of each of the ports of the antenna; and
   displaying, via a display screen, digital designators that indicate respective positions on the antenna that correspond to the ports.

7. The method of claim 1, wherein the detecting comprises identifying different respective unique visual indicators on the cables.

8. The method of claim 7, wherein the visual indicators comprise different respective colors, or different respective combinations of colors, on the cables.

9. The method of claim 8, wherein the colors, or the combinations of colors, are on respective cable collars.

10. The method of claim 7, wherein the visual indicators comprise different respective barcodes, strings of alphanumeric characters, or polygonal shapes on the cables.

11. The method of claim 1, wherein the detecting comprises identifying different respective positions of the cables on the antenna by comparing positions of respective visual indicators that are on the cables with positions of the ports.

12. The method of claim 1, further comprising:
   generating digital designators indicating that the cables are connected to the respective ports of the antenna based on detecting the connections of the cables to the respective ports of the antenna using image recognition;
   wherein assigning the ports of the antenna to the RF switch is in response to the digital designators indicating that the cables are connected to the respective ports of the antenna.

13. The method of claim 1,
   wherein the RF switch comprises switching circuitry defining a plurality of patterns of connection through the RF switch to the ports of the antenna,
   wherein assigning the ports of the antenna to the RF switch comprises automatically assigning one of the plurality of patterns of connection though the RF switch to the ports of the antenna based on the connections of the cables to the respective ports of the antenna, in response to the detecting the connections of the cables to the respective ports of the antenna using the image recognition, and
   wherein testing the antenna comprises testing the antenna using the RF switch using the one of the plurality of patterns of connection.

14. A radio frequency (RF) switch configuration system, the system comprising:
   a first electronic device that is configured to detect, using image recognition, connections of cables to respective ports of an antenna;
   a second electronic device that is configured to,
      receive data regarding the connections of the cables to the respective ports of the antenna, wherein the data regarding the connections of the cables is received from the first electronic device, and
      assign the ports of the antenna to an RF switch based on the connections of cables to the respective ports of the antenna, using the data regarding the connections of the cables received from the first electronic device; and an RF instrument that is configured to test the antenna, using the RF switch.

15. The system of claim 14,
wherein the RF instrument comprises a network analyzer that is configured to measure return loss, isolation, and radiation pattern of the antenna,
wherein the RF switch is configured to connect a first port and a second port of the network analyzer to respective ones of the ports of the antenna,
wherein the ports of the antenna comprise thirty or more ports, and
wherein the antenna comprises a cellular base station antenna.

16. The RF switch configuration system of claim 14,
wherein the first electronic device is further configured to generate digital designators indicating that the cables are connected to the respective ports of the antenna based on detecting the connections of the cables to the respective ports of the antenna using image recognition;
wherein the data regarding the connections of the cables includes the digital designators indicating that the cables are connected to the respective ports of the antenna, and
wherein the second electronic device is configured to assign the ports of the antenna to the RF switch in response to the digital designators indicating that the cables are connected to the respective ports of the antenna.

17. The RF switch configuration system of claim 14,
wherein the RF switch comprises switching circuitry defining a plurality of patterns of connection through the RF switch to the ports of the antenna,
wherein the second electronic device is configured to assign the ports of the antenna to the RF switch by automatically assigning one of the plurality of patterns of connection though the RF switch to the ports of the antenna based on the connections of the cables to the respective ports of the antenna, using the data regarding the connections of the cables received from the first electronic device, and
where the RF instrument is configured to test the antenna using the RF switch using the one of the plurality of patterns of connection.

18. A method comprising:
detecting, using image recognition, respective positions of ports on telecommunications network equipment;
generating first digital designators indicating the positions of first ports of the ports of the telecommunications network equipment;
detecting, using image recognition, connections of respective cables to second ports of the ports of the telecommunications network equipment; and
generating second digital designators indicating that the cables are connected to the second ports and indicating the positions of the second ports to which the cables are connected.

19. The method of claim 18, wherein the detecting the connections comprises detecting color-coded collars on the cables.

20. The method of claim 18,
wherein the detecting the connections comprises detecting visual indicators that are on a surface of the cellular base station antenna,
wherein the telecommunications network equipment is a cellular base station antenna, and
wherein the method further comprises:
determining that the cables are connected to corresponding frequency groups of the ports of the cellular base station antenna, in response to the detecting the visual indicators that are on the surface of the cellular base station antenna; and
triggering passive intermodulation (PIM) testing of the cellular base station antenna, in response to the determining.

21. The method of claim 18,
wherein the detecting the connections comprises determining that at least one of the cables is misconnected to the telecommunications network equipment, and
wherein the method further comprises providing, via an electronic device, a user notification that the at least one of the cables is misconnected.

22. The method of claim 18, further comprising:
calibrating a switch that is coupled to at least one of the cables, in response to the detecting the connections,
wherein, before the calibrating, the at least one of the cables is port-agnostic with respect to the ports of the telecommunications network equipment.

23. The method of claim 18, further comprising:
capturing, by a first electronic device, images of the telecommunications network equipment;
transmitting image data based on the images to a second electronic device that is remote to the first electronic device; and
receiving, at the first electronic device, data from the second electronic device regarding results of the image recognition,
wherein the image recognition is performed using the second electronic device.

24. The method of claim 18,
wherein the cables comprise first cables, and
wherein the method further comprises:
detecting, using image recognition, connections of second cables to the first ports, respectively; and
replacing the first digital designators with third digital designators, in response to the detecting the connections of the second cables to the first ports.

* * * * *